US010654986B2

(12) United States Patent
Tinkl et al.

(10) Patent No.: US 10,654,986 B2
(45) Date of Patent: May 19, 2020

(54) SURFACE TREATED FILLER MATERIAL PRODUCT FOR ALPHA-NUCLEATION OF POLYOLEFINS

(71) Applicant: Omya International AG, Oftringen (CH)

(72) Inventors: Michael Tinkl, Gipf-Oberfrick (CH); Michael Knerr, Oftringen (CH); Franck Baradel, Wintzenheim (FR); Armelle Senti-Wenk, Wettingen (CH)

(73) Assignee: Omya International AG, Oftringen (CH)

( * ) Notice: Subject to any disclaimer, the term of this patent is extended or adjusted under 35 U.S.C. 154(b) by 129 days.

(21) Appl. No.: 15/574,901

(22) PCT Filed: Jun. 20, 2016

(86) PCT No.: PCT/EP2016/064232
§ 371 (c)(1),
(2) Date: Nov. 17, 2017

(87) PCT Pub. No.: WO2016/207121
PCT Pub. Date: Dec. 29, 2016

(65) Prior Publication Data
US 2018/0163014 A1 Jun. 14, 2018

(30) Foreign Application Priority Data
Jun. 23, 2015 (EP) .................. 15173414

(51) Int. Cl.
C08K 3/26 (2006.01)
C08K 5/098 (2006.01)
C08K 9/04 (2006.01)
C08L 23/12 (2006.01)
C08K 5/09 (2006.01)

(52) U.S. Cl.
CPC ............... *C08K 3/26* (2013.01); *C08K 5/09* (2013.01); *C08K 5/098* (2013.01); *C08K 9/04* (2013.01); *C08L 23/12* (2013.01); C08K 2003/265 (2013.01); C08L 2205/24 (2013.01); C08L 2310/00 (2013.01)

(58) Field of Classification Search
CPC .. C08K 3/26; C08K 9/04; C08K 5/098; C08L 23/12
USPC ........................................ 524/425
See application file for complete search history.

(56) References Cited
U.S. PATENT DOCUMENTS

| | | |
|---|---|---|
| 6,936,650 B2 | 8/2005 | Mannion et al. |
| 2005/0101710 A1* | 5/2005 | Lake, Jr. .............. C08J 3/226 524/230 |
| 2005/0101713 A1 | 5/2005 | Lake, Jr. et al. |
| 2005/0197435 A1 | 9/2005 | Dotson et al. |
| 2007/0054142 A1 | 3/2007 | Lee et al. |
| 2007/0213439 A1 | 9/2007 | Wolters et al. |
| 2012/0031576 A1 | 2/2012 | Gane et al. |
| 2012/0045656 A1 | 2/2012 | Radermacher et al. |

FOREIGN PATENT DOCUMENTS

| | | |
|---|---|---|
| DE | 102010036273 A1 | 4/2011 |
| EP | 1921059 A2 | 5/2008 |
| EP | 1939167 A1 | 7/2008 |
| EP | 2070991 A1 | 6/2009 |
| EP | 2264108 A1 | 12/2010 |
| EP | 2264109 A1 | 12/2010 |
| EP | 2325244 A1 | 5/2011 |
| EP | 2325245 A1 | 5/2011 |
| EP | 2390285 A1 | 11/2011 |
| EP | 2722368 A1 | 4/2014 |
| EP | 2770017 A1 | 8/2014 |
| EP | 2843005 A1 | 3/2015 |
| JP | 2007031510 A | 2/2007 |
| WO | 9829494 A1 | 7/1998 |
| WO | 0039222 A1 | 7/2000 |
| WO | 02078924 A2 | 10/2002 |
| WO | 02094759 A1 | 11/2002 |
| WO | 03004554 A1 | 1/2003 |
| WO | 03097731 A1 | 11/2003 |
| WO | 2004083316 A1 | 9/2004 |
| WO | 2005040259 A1 | 5/2005 |
| WO | 2005121257 A2 | 12/2005 |
| WO | 2007033297 A1 | 3/2007 |
| WO | 2009074492 A1 | 6/2009 |
| WO | 2011086582 A1 | 7/2011 |
| WO | 2012112542 A1 | 8/2012 |

OTHER PUBLICATIONS

International Search Report dated Aug. 26, 2016 for PCT/EP2016/064232.
The Written Opinion of the International Searching Authority dated Aug. 26, 2016 for PCT/EP2016/064232.

* cited by examiner

*Primary Examiner* — Deve V Hall
(74) *Attorney, Agent, or Firm* — ALGM LLP; Harry J. Guttman

(57) ABSTRACT

The present invention relates to a surface treated filler material product for alpha-nucleation of polyolefins, a process for the preparation of the surface treated filler material product, a master batch comprising the surface treated filler material product, a polyolefin composition comprising the surface treated filler material product, an article comprising the polyolefin composition as well as the use of the surface treated filler material product as an alpha-nucleating agent for polyolefins.

20 Claims, 4 Drawing Sheets

SURFACE TREATED FILLER MATERIAL PRODUCT FOR ALPHA-NUCLEATION OF POLYOLEFINS

CROSS-REFERENCE TO RELATED APPLICATIONS

Figure 1:
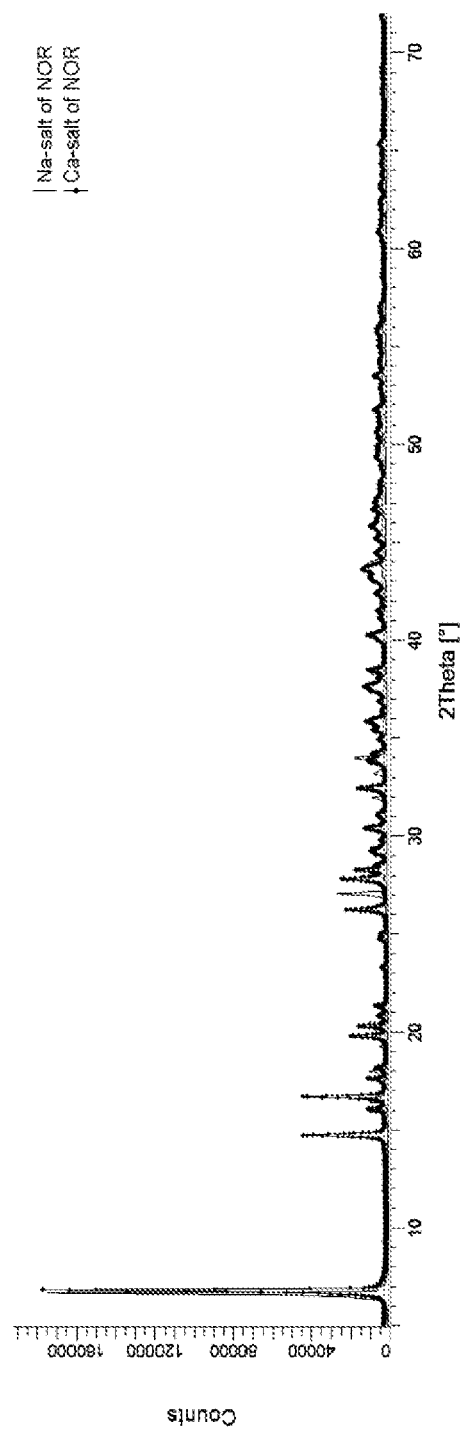
Figure 1:
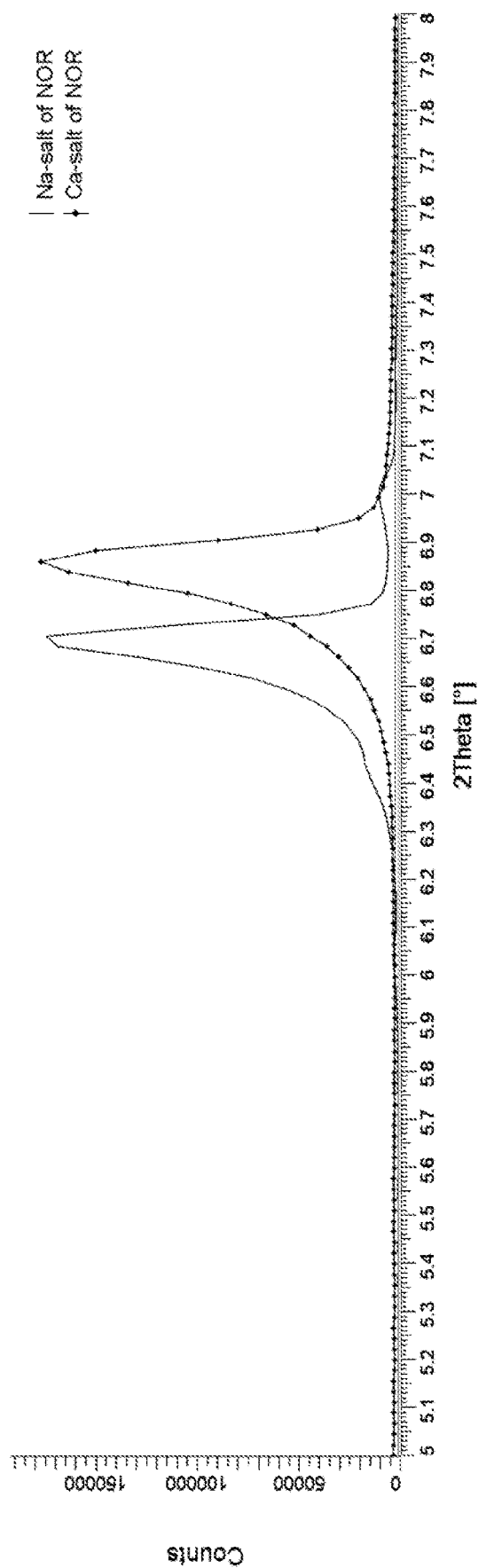

This is a U.S. national phase of PCT Application No. PCT/EP2016/064232, filed Jun. 20, 2016, which claims priority to European Application No. 15173414.2, filed Jun. 23, 2015.

The present invention relates to a surface treated filler material product for alpha-nucleation of polyolefins, a process for the preparation of the surface treated filler material product, a master batch comprising the surface treated filler material product, a polyolefin composition comprising the surface treated filler material product, an article comprising the polyolefin composition as well as the use of the surface treated filler material product as an alpha-nucleating agent for polyolefins.

Polyolefins such as polyethylenes and polypropylenes are the material of choice in many applications as they can be tailored to specific purposes needed. In practice, inorganic materials and especially calcium carbonate-comprising materials are often used in plastics processing in order to modify specific mechanical properties such as to increase stiffness and to provide faster cooling due to high thermal conductivity. However, the fast cooling typically slows down crystallization. Post crystallization will increase crystallinity later but this may take weeks. Thus, fresh plastic products made from polyolefins are typically quite soft such that post processing of the formed parts may create problems.

In the art, several attempts have been made to accelerate crystallization such that a faster processing can be provided and to change product properties. For instance, WO 2005/040259 A1 refers to milled, small particle size, solid bicyclo [2.2.1]heptane dicarboxylate salt-containing thermoplastic nucleating additive formulations further comprising at least one anticaking agent.

The applicant also known about WO 02/094759 A1 referring to a nucleating agent which induces a peak crystallization temperature of at least 125° C. for a test homopolymer polypropylene formulation comprising said nucleating agent, wherein the unnucleated test homopolymer propylene exhibits a density of about 0.9 g/cc, a melt flow of about 12 g/10 min, a Rockwell Hardness (R scale) of about 90, a tensile strength of about 4.931 psi, an elongation at yield of about 10%, a flexural modulus of about 203 ksi, an Izod impact strength of about 0.67 ft-lb/in, and a deflection temperature at 0.46 mPa of about 93° C., and wherein said formulation comprising said nucleating agent is extruded then moulded into plaques having dimensions of about 51 mm×76 mm×1.27 mm, wherein said peak crystallization temperature is measured by differential scanning calorimetry in accordance with a modified ASTM Test Method D3417-99 at heating and cooling rates of 20° C./minute, and wherein said nucleating agent also exhibits no appreciable fugitivity from said test homopolymer polypropylene formulation during compounding of said test homopolymer polypropylene formulation comprising said nucleating agent.

US 2005/0101710 A1 refers to a method of producing a thermoplastic article comprising the steps of (a) providing a thermoplastic polymer; (b) providing a thermoplastic additive concentrate comprising at least one polymer constituent, at least one saturated bicyclic dicarboxylate salt nucleating agent, and at least one dispersion aid additive; wherein said nucleating agent is present within said concentrate in an amount of from about 2 to about 20% by total weight thereof; (c) incorporating said concentrate within said thermoplastic polymer formulation when both of said thermoplastic polymer formulation and concentrate are in molten form, thereby permitting said concentrate to melt and be mixed within said thermoplastic polymer; and (d) allowing the resultant concentrate-containing thermoplastic polymer to cool.

WO 03/004554 A1 refers to certain thermoplastic additives that induce simultaneously low clarity and high nucleation efficacy. Such additives include combinations of certain bicyclic salts and thermoplastic clarifying agents, including certain dibenzylidene sorbitol acetals and derivatives.

US 2005/0197435 A1 refers to methods of inducing high nucleation rates in thermoplastics, such as polyolefins, through the introduction of two different compounds that are substantially soluble within the target molten thermoplastic resin are provided. Such introduced components react to form a nucleating agent in situ within such a target molten thermoplastic resin which is then allowed to cool. Preferably, one compound is an acid, preferably bicyclic (i.e., two cyclic systems sharing at least three carbon atoms) or monocycloaliphatic (i.e., a single, saturated ring system) in nature, such as, without limitation, bicyclo[2.2.1]heptane dicarboxylic acid or hexahydrophthalic acid, and the other compound is an organic salt, such as a carboxylate, sulfonate, phosphate, oxalate, and the like, and more preferably selected from the group consisting of metal C8-C22 esters.

US 2007/0213439 A1 refers to a blend of two different compounds which may be applied together to form a nucleating agent additive composition. The blend comprises a bicyclo[2.2.1]heptane dicarboxylate salt and a dicarboxylate calcium metal salt.

WO 02/078924 A2 refers to compounds and compositions comprising specific metal salts of hexahydrophthalic acid (HHPA).

DE 10 2010 036 273 A1 refers to a polypropylene resin composition comprising (a) 100 parts by weight of a resin composition, which contains 51 to 99% by weight of a propylene polymer and 1 to 49% by weight of an ethylene polymer having a density of 0.85 to 0.93 g/cm³, and (b) 0.001 to 0.5 part by weight of a metal salt defined by a specific chemical formula; and a process for producing such a polypropylene resin composition, comprising the steps of (1) mixing 1 to 100 parts by weight of the metal salt with 100 parts by weight of the propylene polymer and/or the ethylene polymer, thereby producing a master batch, and (2) mixing the master batch with a mixture containing the propylene polymer and the ethylene polymer.

US 2007/0054142 A1 refers to a tie-layer adhesive composition comprising: (a) an adhesive blend comprising 70 to 99.5 weight percent polyethylene homopolymer or copolymer base resin and 0.5 to 30 weight percent modified polyolefin having ethylenically unsaturated carboxylic acid or acid derivative functionality grafted to the polymer backbone; and (b) 100 to 20 000 ppm saturated bicyclic dicarboxylate salt modifier wherein the rings share at least two non-adjacent carbon atoms.

WO 2007/033297 A1 refers to a polymer composition comprising a polyolefin and a nucleating or clarifying agent dispersed or dissolved in the polyolefin. The nucleating or clarifying agent is selected from the group consisting of: benzoic acid salts, substituted benzoic acid salts, dicarboxylate metal salts, hexahydrophthalic acid metal salts, sorbitol acetals, phosphate ester salts, glycerolate salts, di-, tri-, and tetra-amides, pine rosin derivatives, 2,6-naphthalene dicarboxamides, polyvinylcyclohexane, high crystallinity polypropylenes, branched polypropylenes, talc, and pigments.

WO 2011/086582 A2 refers to metal salts capable as nucleating agents for polyolefins. Such salts are synthesized by reacting potassium hydroxide with carboxylic acids.

EP 1 921 059 A2 refers to compounds and compositions comprising specific metal salts of bicyclo[2.2.1]heptane dicarboxylate salts.

WO 98/29494 A1 refers to modifying agents for polyolefins. A particularly preferred modifying agent is camphenic acid and its salts.

EP 2 325 245 A1 refers to a composition for beta-nucleation of polypropylene, comprising: (a) a particulate mineral solid support, comprising a compound of a IUPAC Group 2 metal, and (b) on the surface of the particulate solid support (b1) a salt of a dicarboxylic acid, wherein the dicarboxylic acid has from 7 to 10 carbon atoms, and (b2) a dispersing and/or grinding agent.

EP 2 325 244 A1 refers to a polymer composition comprising a polypropylene and a beta-nucleating agent, wherein the beta-nucleating agent comprises: (a) a particulate natural mineral solid support, comprising a compound of a IUPAC Group 2 metal, and (b) on the surface of the particulate mineral solid support (b1) a salt of a dicarboxylic acid, wherein the dicarboxylic acid has from 7 to 10 carbon atoms, and (b2) a dispersing and/or grinding agent.

EP 1 939 167 A1 refers to a nucleating agent for polypropylene and a process for preparing same. Preferably, the nucleating agent is a water-free admixture of calcium carbonate and a calcium salt of a dibasic organic acid.

WO 03/097731 A1 refers to a polypropylene comprising propylene homopolymers with melt indices of 0.05 to 15 g/10 min at 230° C./2.16 kg or propylene block copolymers with 90.0 to 99.9 wt.-% propylene and 0.1 to 10 wt.-% α-olefins with 2 or 4 to 18 carbon atoms with melt indices of 0.05 to 20 g/10 min at 230° C./2.16 kg, or mixtures thereof, wherein the propylene homopolymers or propylene block copolymers are β-nucleated propylene polymers, whereby the (β-nucleated propylene homopolymers have an IRτ>0.9, a tensile modulus of 1 300 MPa at +23° C. and a Charpy impact strength of ≥3 kJ/m² at −20° C. using notched test specimens, and the β-nucleated propylene block copolymers are polymers having an IRτ of the propylene homopolymer block of >0.9, a tensile modulus of ≥900 MPa at +23° C. and a Charpy impact strength, of ≥5 kJ/m² at −20° C., using notched test specimens and 1 to 70% of a filler, such as talc, calcium carbonate, glass spheres, mica, wollastonite, wood flour, zincoxide, bariumsulphate, clay, the compositions having a β-crystalline phase determined by DSC of at least 30% and a pipe made thereof having a burst pressure test result of at least 40 hours at 80° C. and 4.2 MPa.

WO 2012/112542 A1 refers to an alpha nucleated polypropylene resin comprising an alpha-nucleating agent produced by an in-situ reaction between a dispersed particle and a second chemical that dissolves in a molten polypropylene. The dispersed particle preferably comprises sodium carbonate, sodium bicarbonate, lithium carbonate, or a combination thereof and the second chemical preferably comprises benzoic acid.

US 2005/0101710 A1 and US 2005/0101713 A1 relate to concentrates of certain dicarboxylate salt thermoplastic nucleating additives and to methods of producing thermoplastics with such nucleator additive concentrates and thermoplastic articles made thereof.

JP 2007-31510 refers to a polyolefin resin composition containing a nucleating additive, e.g. the disodium salt of Bicyclo[2.2.1]Heptane-2,3-Dicarboxylic Acid.

However, the prior art does rarely disclose nucleating agents that are suitable for polyolefins and which would solve the following multifaceted technical problem:
 the nucleating agent effectively affects the α-nucleation of polyolefins;
 the nucleating agent affects early crystallization and thus allows faster post processing, such as injection moulding, thermoforming, blow moulding and the like, of the fresh plastic product;
 the nucleating agent increases the mechanical properties of a plastic product such as the modulus and/or stress at yield;
 the nucleating agent can be used in amounts being below the effective amount of bicyclo[2.2.1]heptane-2,3-dicarboxylic acid typically used;
 to provide a process for preparing such a nucleating agent.

Thus, there is still a need for nucleating agents which address the foregoing technical problems described and especially for nucleating agents being suitable for the α-nucleation of polyolefins which affects early crystallization at low amounts and improves the mechanical properties of the plastic product prepared from the corresponding polyolefin.

Accordingly, it is an objective of the present invention to provide a nucleating agent which effectively affects the α-nucleation of polyolefins. A further objective is to provide a nucleating agent that affects early crystallization and thus allows faster post processing, such as injection moulding, thermoforming, blow moulding and the like, of the fresh plastic product. A further objective is to provide a nucleating agent imparting improved mechanical properties such as the modulus and/or stress at yield to final plastic products. An even further objective is to provide a nucleating agent that can be used in amounts being below the effective amount of bicyclo[2.2.1]heptane-2,3-dicarboxylic acid typically used. A further objective is to provide a nucleating agent prepared by a process that can be carried out under cost-efficient and mild conditions. Further objectives can be gathered from the following description of the invention.

The foregoing and other objectives are solved by the subject-matter as defined herein in claim 1.

Advantageous embodiments of the inventive nucleating agent are defined in the corresponding sub-claims.

According to one aspect of the present application, a surface treated filler material product for alpha-nucleation of polyolefins is provided, the surface treated filler material product comprising
 (a) a calcium carbonate-comprising filler material, and
 (b) a bicyclo[2.2.1]heptane-2,3-dicarboxylic acid and/or a monovalent salt of the bicyclo[2.2.1]heptane-2,3-dicarboxylic acid and/or a divalent salt of the bicyclo[2.2.1]heptane-2,3-dicarboxylic acid being present on at least a part of the accessible surface area of the calcium carbonate-comprising filler material.

The inventors surprisingly found out that the foregoing surface treated filler material product functions as alpha-nucleating agent. In particular, it has been found out that the surface treated filler material product effectively affects the alpha-nucleation of polyolefins and early crystallization and thus allows faster post processing, such as injection moulding, thermoforming, blow moulding and the like, of the fresh plastic product. Furthermore, the surface treated filler material product imparts improved mechanical properties such as the modulus and/or stress at yield to final plastic products.

In addition thereto, the surface treated filler material product can be used in amounts being below the effective amount of bicyclo[2.2.1]heptane-2,3-dicarboxylic acid typically used. Furthermore, the surface treated filler material product can be prepared by a process that can be carried out under cost-efficient and mild conditions.

It should be understood that for the purposes of the present invention, the following terms have the following meanings:

For the purpose of the present invention, the term "calcium carbonate-comprising filler material" refers to a material that comprises at least 80 wt.-% calcium carbonate, based on the total dry weight of the calcium carbonate-comprising filler material.

The term "surface treated filler material product" in the meaning of the present invention refers to a calcium carbonate-containing filler material which has been contacted with a surface treatment agent such as to obtain a coating layer on at least a part of the accessible surface area of the calcium carbonate-containing filler material.

The applicant assumes that at least a part of the monovalent salt of the bicyclo[2.2.1]heptane-2,3-dicarboxylic acid and/or the divalent salt of the bicyclo[2.2.1]heptane-2,3-dicarboxylic acid is formed when bicyclo[2.2.1]heptane-2,3-dicarboxylic acid is applied as surface treatment agent. Additionally, it is also assumed that reactive molecules located at the surface of the calcium carbonate-comprising filler material may have an influence on the formation of further reaction products.

The term "monovalent salt of the bicyclo[2.2.1]heptane-2,3-dicarboxylic acid" in the meaning of the present invention refers to a cation having a valency of one and which is suitable of forming a salt with the bicyclo[2.2.1]heptane-2,3-dicarboxylic acid.

The term "divalent salt of the bicyclo[2.2.1]heptane-2,3-dicarboxylic acid" in the meaning of the present invention refers to a cation having a valency of two and which is suitable of forming a salt with the bicyclo[2.2.1]heptane-2,3-dicarboxylic acid.

The term "accessible surface area" in the meaning of the present invention refers to the surface of the calcium carbonate-comprising filler material that is accessible or exposed to the surface treatment agent, i.e. the bicyclo[2.2.1]heptane-2,3-dicarboxylic acid and/or a monovalent salt of the bicyclo[2.2.1]heptane-2,3-dicarboxylic acid and/or a divalent salt of the bicyclo[2.2.1]heptane-2,3-dicarboxylic acid, applied by coating techniques known to the skilled person such as hot fluidised bed spray coating, hot-wet coating, solvent-assisted or self-assembly coating, mixing in a MTI-mixer and the like and thereby forming a treatment layer comprising the surface treatment agent on the surface of the calcium carbonate-comprising filler material particles. The total weight of the surface treatment agent on the accessible surface area of the filler can be determined, for example, by well known techniques such as thermogravimetric analysis by mass loss between 105° C. to 400° C. In case that the filler is treated with a hydrophobising agent before and/or during and/or after the treatment with the bicyclo[2.2.1]heptane-2,3-dicarboxylic acid and/or a monovalent salt of the bicyclo[2.2.1]heptane-2,3-dicarboxylic acid and/or a divalent salt of the bicyclo[2.2.1]heptane-2,3-dicarboxylic acid, the expression "accessible surface area" covers also parts of the surface of the calcium carbonate-comprising filler material particles that are already coated with a hydrophobising agent or the bicyclo[2.2.1]heptane-2,3-dicarboxylic acid and/or a monovalent salt of the bicyclo[2.2.1]heptane-2,3-dicarboxylic acid and/or a divalent salt of the bicyclo[2.2.1]heptane-2,3-dicarboxylic acid, i.e. at least partially double layers of these compounds may form.

Polyolefins like polypropylene can crystallize in one or more of three different crystalline forms known as the alpha, beta and gamma forms. The alpha phase is the most common and most stable form of polypropylene. In the gist of the present invention, the expression "alpha nucleation" means the first step in the formation of the alpha form of a polyolefin. The crystalline form can e.g. be determined by well known X-ray crystal structure analysis or melting point analysis, such as by DSC.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This, e.g., means that, unless the context clearly dictates otherwise, the term "obtained" does not mean to indicate that, e.g., an embodiment must be obtained by, e.g., the sequence of steps following the term "obtained" even though such a limited understanding is always included by the terms "obtained" or "defined" as a preferred embodiment.

According to another aspect of the present invention, a process for the preparation of the surface treated filler material product, as defined herein, is provided, the process comprising the following steps:

(i) providing a calcium carbonate-comprising filler material, (ii) providing a bicyclo[2.2.1]heptane-2,3-dicarboxylic acid and/or a monovalent salt of the bicyclo[2.2.1]heptane-2,3-dicarboxylic acid and/or a divalent salt of the bicyclo[2.2.1]heptane-2,3-dicarboxylic acid, (iii) contacting the calcium carbonate-comprising filler material and the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid at a temperature in the range from 157 to 300° C.

It is preferred that the process further comprises a step of (iv) drying the surface treated filler material product after step (iii), at a temperature in the range from 60 to 200° C., preferably until the moisture content of the surface treated filler material product is in the range from 0.01 to 0.2 wt.-%, based on the total weight of the dried surface treated filler material product, and/or (v) treating the calcium carbonate-comprising filler material before and/or during and/or after step (iii) or the surface treated filler material product obtained in step (iv) in one or more steps with at least one hydrophobising agent at a temperature from 30 to 200° C., wherein the at least one hydrophobising agent is added in an amount such that the amount, in mg, of the at least one hydrophobising agent on the accessible surface area of the calcium carbonate-comprising filler material, in m², is from 0.001 to 9 mg/m², preferably from 0.01 to 8 mg/m² and more preferably from 0.1 to 4 mg/m².

According to a further aspect a master batch comprising the surface treated filler material product, as defined herein, and a polyolefin is provided. According to still another aspect a process for preparing a master batch comprising steps (i) to (iii) according to claim 10 and optionally steps (iv) and/or (v) and a further step (I) of incorporating >55 to 90 wt.-% and preferably 60 to 80 wt.-% of the surface treated filler material product obtained after step (iii), (iv) or (v) into a polyolefin is provided.

According to another aspect a polyolefin composition comprising the surface treated filler material product, as defined herein, is provided. According to a further aspect a process for preparing a polyolefin composition comprising steps (i) to (iii) and optionally steps (iv) and/or (v) and a further step (I) of incorporating 0.01 wt.-% to 55 wt.-% of the surface treated filler material product obtained after step (iii), (iv) or (v) into a polyolefin is provided.

It is preferred that the polyolefin of the master batch and/or polyolefin composition is selected from the group consisting of polybutylene, polypropylene, polyethylene and mixtures thereof, preferably polypropylene. It is further preferred that the polyolefin composition comprises 0.01 wt.-% to 55 wt.-%, preferably 0.05 wt.-% to 30 wt.-%, more preferably 0.075 wt.-% to 20 wt.-%, even more preferably 0.1 wt.-% to 5 wt.-% of the surface treated filler material product, based on the total weight of the polyolefin composition.

According to an even further aspect, an article comprising the polyolefin composition, as defined herein, is provided. According to a still further aspect, the use of the surface treated filler material product, as defined herein, as an alpha-nucleating agent for polyolefins, preferably for polypropylene, is provided.

According to one embodiment of the surface treated filler material product, the polyolefin is selected from the group consisting of polybutylene, polypropylene, polyethylene and mixtures thereof, and preferably polypropylene.

According to another embodiment of the surface treated filler material product, the calcium carbonate-comprising filler material is selected from the group consisting of natural ground calcium carbonate, precipitated calcium carbonate, surface-modified calcium carbonate, and mixtures thereof.

According to yet another embodiment of the surface treated filler material product, the calcium carbonate-comprising filler material is selected from natural ground calcium carbonate and preferably is selected from the group consisting of marble, limestone, chalk, dolomite, and mixtures thereof.

According to one embodiment of the surface treated filler material product, the amount of the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid, in mg, on the accessible surface area of the calcium carbonate-comprising filler material, in m², is from 0.001 mg/m² to 500 mg/m², preferably from 0.01 mg/m² to 250 mg/m² and more preferably from 0.1 mg/m² to 30 mg/m².

According to another embodiment of the surface treated filler material product, the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid is present on the accessible surface area of the calcium carbonate-comprising filler material in an amount of 0.0001 wt.-% to 30 wt.-%, preferably 0.001 wt.-% to 10 wt.-%, more preferably 0.005 to 5 wt.-%, even more preferably 0.0075 to 3 wt.-% and most preferably 0.01 wt.-% to 2 wt.-%, based on the total dry weight of the calcium carbonate-comprising filler material.

According to yet another embodiment of the surface treated filler material product, the monovalent salt of the bicyclo[2.2.1]heptane-2,3-dicarboxylic acid is selected from sodium salts, potassium salts, ammonium salts and mixtures thereof and/or the divalent salt of the bicyclo[2.2.1]heptane-2,3-dicarboxylic acid is selected from calcium salts, magnesium salts and mixtures thereof.

According to one embodiment of the surface treated filler material product, the surface treated filler material product further comprises
(c) at least one hydrophobising agent on at least a part of the accessible surface area of the calcium carbonate-comprising filler material, wherein the amount, in mg, of the at least one hydrophobising agent on the accessible surface area of the calcium carbonate-comprising filler material, in m², is from 0.001 to 9 mg/m², preferably from 0.01 to 8 mg/m² and more preferably from 0.1 to 4 mg/m².

According to another embodiment of the surface treated filler material product, the at least one hydrophobising agent is selected from the group consisting of an aliphatic carboxylic acid having a total amount of carbon atoms from $C_4$ to $C_{24}$ and/or reaction products thereof, a mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or reaction products thereof, a phosphoric acid ester blend of one or more phosphoric acid mono-ester and/or reaction products thereof and one or more phosphoric acid di-ester and/or reaction products thereof, a polyhydrogensiloxane and/or reaction products thereof, an inert silicone oil, preferably polydimethylsiloxane, and/or reaction products thereof, an aliphatic aldehyde and/or reaction products thereof, and mixtures thereof.

As set out above, the inventive surface treated filler material product for alpha-nucleation of polyolefins comprises a calcium carbonate-comprising filler material, and a bicyclo[2.2.1]heptane-2,3-dicarboxylic acid and/or a monovalent salt of the bicyclo[2.2.1]heptane-2,3-dicarboxylic acid and/or a divalent salt of the bicyclo[2.2.1]heptane-2,3-dicarboxylic acid being present on at least a part of the accessible surface area of the calcium carbonate-comprising filler material as set out in points (a) and (b). In the following, it is referred to further details of the present invention and especially the foregoing points of the inventive surface treated filler material product.

Surface Treated Filler Material Product

According to point (a) of the present invention, the surface treated filler material product comprises a calcium carbonate-comprising filler material.

The calcium carbonate-comprising filler material is preferably selected from the group consisting of natural ground calcium carbonate (GCC), precipitated calcium carbonate (PCC), surface-modified calcium carbonate (MCC), and mixtures thereof. According to a preferred embodiment, the calcium carbonate-comprising filler material is a natural ground calcium carbonate (GCC).

GCC is understood to be a naturally occurring form of calcium carbonate, mined from sedimentary rocks such as limestone or chalk, from metamorphic marble rocks, eggshells, or seashells, and processed through a treatment such as grinding, screening and/or fractionating in wet and/or dry form, for example by a cyclone or classifier. In one embodiment of the present invention, the GCC is selected from the group comprising marble, chalk, dolomite, limestone, and mixtures thereof.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water or by precipitation of calcium and carbonate ions, for example $CaCl_2$ and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form. Vaterite belongs to the hexagonal crystal system. The obtained PCC slurry can be mechanically dewatered and dried.

A "surface-modified calcium carbonate" may feature surface-reacted GCC or PCC. A surface-reacted calcium carbonate may be prepared by providing a GCC or PCC in form of an aqueous suspension, and adding an acid to said suspension. Suitable acids are, for example, sulphuric acid, hydrochloric acid, phosphoric acid, citric acid, oxalic acid, or a mixture thereof. In a next step, the calcium carbonate is treated with gaseous carbon dioxide. If a strong acid such as sulphuric acid or hydrochloric acid is used for the acid treatment step, the carbon dioxide will form automatically in situ. Alternatively or additionally, the carbon dioxide can be supplied from an external source. Surface-reacted calcium carbonates are described, for example, in US 2012/0031576 A1, WO 2009/074492 A1, EP 2 264 109 A1, EP 2 070 991 A1, EP 2 264 108 A1, WO 00/39222 A1, WO 2004/083316 A1 or WO 2005/121257 A2.

In one preferred embodiment, the calcium carbonate-comprising filler material is marble.

According to one embodiment of the present invention, the amount of calcium carbonate in the calcium carbonate-comprising filler material is at least 80 wt.-%, e.g. at least 95 wt.-%, preferably between 97 and 100 wt.-%, more preferably between 98.5 and most preferably 99.95 wt.-%, based on the total dry weight of the calcium carbonate-comprising filler material.

The term "dry" calcium carbonate-comprising filler material is understood to be a filler material having less than 0.3% by weight of water relative to the filler material weight. The % water (equal to "residual total moisture content") is determined according to the Coulometric Karl Fischer measurement method, wherein the filler material is heated to 220° C., and the water content released as vapour and isolated using a stream of nitrogen gas (at 100 ml/min) is determined in a Coulometric Karl Fischer unit.

The calcium carbonate-comprising filler material is in powder form, i.e. in the form of a particulate material, and may have a particle size distribution as conventionally employed in polyolefins.

According to one embodiment of the present invention, the calcium carbonate-comprising filler material has a weight median particle size $d_{50}$ from 0.05 μm to 10 μm, preferably from 0.1 μm to 7 μm, more preferably from 0.25 μm to 5 μm, and most preferably from 0.5 μm to 4 μm.

According to one embodiment of the present invention, the calcium carbonate-comprising filler material has a top cut ($d_{98}$) of ≤25 μm, preferably of ≤20 μm, more preferably of ≤17.5 μm, and most preferably of ≤15 μm.

Throughout the present document, the "particle size" of a calcium carbonate-comprising filler material or other particulate materials is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{98}$ value is the particle size at which 98 wt.-% of all particles are smaller. The $d_{98}$ value is also designated as "top cut". The $d_{50}$ value is thus the weight median particle size, i.e. 50 wt.-% of all grains are bigger whilst the remaining 50 wt.-% are smaller than this particle size. For the purpose of the present invention the particle size is specified as weight median particle size $d_{50}$ unless indicated otherwise. For determining the weight median particle size $d_{50}$ value or the top cut particle size $d_{98}$ value a Sedigraph™ 5100 or 5120 device from the company Micromeritics, USA, can be used. The method and the instrument are known to the skilled person and are commonly used to determine grain size of fillers and pigments. The measurement is carried out in an aqueous solution of 0.1 wt.-% $Na_4P_2O_7$. The samples are dispersed using a high speed stirrer and supersonics.

According to another embodiment, the calcium carbonate-comprising filler material has a BET specific surface area of from 0.5 and 150 $m^2/g$, preferably from 0.5 to 50 $m^2/g$, more preferably from 0.5 to 35 $m^2/g$, and most preferably from 0.5 to 15 $m^2/g$, as measured using nitrogen and the BET method according to ISO 9277.

The term "specific surface area" (in $m^2/g$) of the calcium carbonate-comprising filler material in the meaning of the present invention is determined using the BET method with nitrogen as adsorbing gas, which is well known to the skilled man (ISO 9277:1995). The total surface area (in $m^2$) of the calcium carbonate-comprising filler material is then obtained by multiplying the specific surface area by the mass (in g) of the calcium carbonate-comprising filler material prior to treatment.

In one embodiment of the present invention, the calcium carbonate-comprising filler material is preferably a marble having a median particle size diameter $d_{50}$ value from 0.05 μm to 10 μm, preferably from 0.1 μm to 7 μm, more preferably from 0.25 μm to 5 μm and most preferably from 0.5 μm to 4 μm and a top cut ($d_{98}$) of ≤25 μm, preferably of ≤20 μm, more preferably of ≤17.5 μm, and most preferably of ≤15 μm. In this case, the calcium carbonate-comprising filler material has a BET specific surface area of from 0.5 to 150 $m^2/g$, preferably of from 0.5 to 50 $m^2/g$, more preferably of from 0.5 to 35 $m^2/g$ and most preferably of from 0.5 to 15 $m^2/g$, measured using nitrogen and the BET method according to ISO 9277.

The calcium carbonate-comprising filler material is preferably a dry ground material, a material being wet ground and dried or a mixture of the foregoing materials. In general, the grinding step can be carried out with any conventional grinding device, for example, under conditions such that refinement predominantly results from impacts with a secondary body, i.e. in one or more of: a ball mill, a rod mill, a vibrating mill, a roll crusher, a centrifugal impact mill, a vertical bead mill an attrition mill, a pin mill, a hammer mill, a pulveriser, a shredder, a de-clumper, a knife cutter, or other such equipment known to the skilled man.

In case the calcium carbonate-comprising filler material is a wet ground calcium carbonate-comprising filler material, the grinding step may be performed under conditions such that autogenous grinding takes place and/or by horizontal ball milling, and/or other such processes known to the skilled man. It is to be noted that the same grinding methods can be used for dry grinding the calcium carbonate-comprising filler material. The wet processed ground calcium carbonate-comprising filler material thus obtained may be washed and dewatered by well-known processes, e.g. by flocculation, filtration or forced evaporation prior to drying. The subsequent step of drying may be carried out in a single step such as spray drying, or in at least two steps, e.g. by applying a first heating step to the calcium carbonate-comprising filler material in order to reduce the associated moisture content to a level which is not greater than about 0.5 wt.-%, based on the total dry weight of the calcium carbonate-comprising filler material. The residual total moisture content of the filler material can be measured by the Karl Fischer Coulometric titration method, desorbing the moisture in an oven at 195° C. and passing it continuously into the KF Coulometer (Mettler Toledo Coulometric KF Titrator C30, combined with Mettler oven DO 0337) using dry $N_2$ at 100 ml/min for 10 min. The residual total moisture content can be determined with a calibration curve and also a blind of 10 min gas flow without a sample can be taken into account. The residual total moisture content may be further reduced by applying a second heating step to the calcium carbonate-comprising filler material. In case said drying is carried out by more than one drying steps, the first step may be carried out by heating in a hot current of air, while the second and further drying steps are preferably carried out by an indirect heating in which the atmosphere in the corresponding vessel comprises a surface treatment agent. It is also common that the calcium carbonate-comprising filler material is subjected to a beneficiation step (such as a flotation, bleaching or magnetic separation step) to remove impurities.

In one embodiment of the present invention, the calcium carbonate-comprising filler material comprises a dry ground calcium carbonate-comprising filler material. In another embodiment, the calcium carbonate-comprising filler material is a material being wet ground in a horizontal ball mill, and subsequently dried by using the well-known process of spray drying.

In one embodiment, the calcium carbonate-comprising filler material has a residual moisture content of ≤1 wt.-%, based on the total dry weight of the calcium carbonate-comprising filler material. Depending on the calcium carbonate-comprising filler material, the calcium carbonate-comprising filler material has a residual total moisture content of from 0.01 to 1 wt.-%, preferably from 0.01 to 0.2 wt.-%, more preferably from 0.02 to 0.15 wt.-% and most preferably from 0.04 to 0.15 wt.-%, based on the total dry weight of the calcium carbonate-comprising filler material.

For example, in case a wet ground and spray dried marble is used as calcium carbonate-comprising filler material, the residual total moisture content of the calcium carbonate-comprising filler material is preferably from 0.01 to 0.1 wt.-%, more preferably from 0.02 to 0.08 wt.-%, and most preferably from 0.04 to 0.07 wt.-%, based on the total dry weight of the calcium carbonate-comprising filler material. If a PCC is used as calcium carbonate-comprising filler material, the residual total moisture content of the calcium carbonate-comprising filler material is preferably of from 0.01 to 0.2 wt.-%, more preferably from 0.05 to 0.17 wt.-%, and most preferably from 0.05 to 0.10 wt.-%, based on the total dry weight of the calcium carbonate-comprising filler material.

In accordance with the present invention, the surface treated filler material product comprises a treatment layer located on at least a part of the accessible surface area of the calcium carbonate-comprising filler material. Thus, according to point (b) of the present surface treated filler material product, the calcium carbonate-comprising filler material comprises on at least a part of the accessible surface area a bicyclo[2.2.1]heptane-2,3-dicarboxylic acid and/or a monovalent salt of the bicyclo[2.2.1]heptane-2,3-dicarboxylic acid and/or a divalent salt of the bicyclo[2.2.1]heptane-2,3-dicarboxylic acid.

The surface treated filler material product has the advantage that it provides good dispersion in the polyolefin such that nearly all molecules of the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid being present on at least a part of the accessible surface area of the calcium carbonate-comprising filler material are readily available to the polyolefin. As a result, the alpha-nucleation of polyolefins and early crystallization is effectively affected and thus allow faster post processing, such as injection moulding, thermoforming, blow moulding and the like, of the fresh plastic product.

Furthermore, it is well known that bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid typically form(s) agglomerates when mixed as free compound(s) into a polyolefin such that only a limited amount of said compound(s) is/are available for alpha-nucleation of the polyolefin. In contrast thereto, the provision of the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid on at least a part of the accessible surface area of the calcium carbonate-comprising filler material allows using them in amounts being below the effective amount typically used, i.e. the free compound(s) and optionally in an admixture with calcium carbonate (without forming a treatment layer on the calcium carbonate surface), because no agglomerates are formed and nearly all molecules located on the calcium carbonate-comprising filler material surface are readily available to the polyolefin.

Thus, it is appreciated that the surface treated filler material product comprises, preferably consists of, a calcium carbonate-comprising filler material and a bicyclo[2.2.1]heptane-2,3-dicarboxylic acid and/or a monovalent salt of the bicyclo[2.2.1]heptane-2,3-dicarboxylic acid and/or a divalent salt of the bicyclo[2.2.1]heptane-2,3-dicarboxylic acid being present on at least a part of the accessible surface area of the calcium carbonate-comprising filler material.

In one embodiment of the present invention, the surface treated filler material product comprises the calcium carbonate-comprising filler material in an amount of ≥70.0 wt.-%, based on the total dry weight of the surface treated filler material product. For example, the surface treated filler material product comprises the calcium carbonate-comprising filler material in an amount of ≥90.0 wt.-% and preferably of ≥98.0 wt.-%, based on the total dry weight of the surface treated filler material product.

In case bicyclo[2.2.1]heptane-2,3-dicarboxylic acid is present on the accessible surface area of the calcium carbonate-comprising filler material, the reaction degree (or conversion degree) may be established by titration.

According to one embodiment, the at least one surface treated filler material product comprises the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid such that the amount of the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid, in mg, on the accessible surface area of the calcium carbonate-comprising filler material, in $m^2$, is from 0.001 $mg/m^2$ to 500 $mg/m^2$. Preferably, the amount of the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid, in mg, on the accessible surface area of the calcium carbonate-comprising filler material, in $m^2$, is from 0.01 $mg/m^2$ to 250 $mg/m^2$ and more preferably from 0.1 $mg/m^2$ to 30 $mg/m^2$.

Additionally or alternatively, the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid is present on the accessible surface area of the calcium carbonate-comprising filler material in an amount of 0.0001 wt.-% to 30 wt.-%, based on the total dry weight of the calcium carbonate-comprising filler material. Preferably, the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid is present on the accessible surface area of the calcium carbonate-comprising filler material in an amount of 0.001 wt.-% to 10 wt.-%, more preferably 0.005 to 5 wt.-%, even more preferably 0.0075 to 3 wt.-% and most preferably 0.01 wt.-% to 2 wt.-%, based on the total dry weight of the calcium carbonate-comprising filler material.

According to one embodiment the treatment layer comprising the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid is on the whole accessible surface area of the calcium carbonate-comprising filler material.

It is appreciated that the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid is present on at least a part of the accessible surface area of the calcium carbonate-comprising filler material.

For example, the bicyclo[2.2.1]heptane-2,3-dicarboxylic acid and the monovalent salt of the bicyclo[2.2.1]heptane-2,3-dicarboxylic acid and the divalent salt of the bicyclo[2.2.1]heptane-2,3-dicarboxylic acid are present on at least a part of the accessible surface area of the calcium carbonate-comprising filler material.

Alternatively, the bicyclo[2.2.1]heptane-2,3-dicarboxylic acid or the monovalent salt of the bicyclo[2.2.1]heptane-2,3-dicarboxylic acid or the divalent salt of the bicyclo[2.2.1]heptane-2,3-dicarboxylic acid are present on at least a part of the accessible surface area of the calcium carbonate-comprising filler material.

Preferably, the bicyclo[2.2.1]heptane-2,3-dicarboxylic acid and the monovalent salt of the bicyclo[2.2.1]heptane-2,3-dicarboxylic acid and/or the divalent salt of the bicyclo[2.2.1]heptane-2,3-dicarboxylic acid are present on at least a part of the accessible surface area of the calcium carbonate-comprising filler material. For example, the bicyclo[2.2.1]heptane-2,3-dicarboxylic acid and the divalent salt of the bicyclo[2.2.1]heptane-2,3-dicarboxylic acid are present on at least a part of the accessible surface area of the calcium carbonate-comprising filler material. Alternatively, the bicyclo[2.2.1]heptane-2,3-dicarboxylic acid and the monovalent salt of the bicyclo[2.2.1]heptane-2,3-dicarboxylic acid are present on at least a part of the accessible surface area of the calcium carbonate-comprising filler material.

The bicyclo[2.2.1]heptane-2,3-dicarboxylic acid can be present in all stereochemical configurations. However, the cis-configuration of the bicyclo[2.2.1]heptane-2,3-dicarboxylic acid is preferred. Most preferably, the bicyclo[2.2.1]heptane-2,3-dicarboxylic acid is present in the cis-endo-configuration.

The monovalent salt of the bicyclo[2.2.1]heptane-2,3-dicarboxylic acid is preferably selected from sodium salts, potassium salts, ammonium salts and mixtures thereof. More preferably, the monovalent salt of the bicyclo[2.2.1]heptane-2,3-dicarboxylic acid is selected from sodium salts and/or ammonium salts. For example, the monovalent salt of the bicyclo[2.2.1]heptane-2,3-dicarboxylic acid is selected from sodium salts and ammonium salts. Alternatively, the monovalent salt of the bicyclo[2.2.1]heptane-2,3-dicarboxylic acid is selected from sodium salts or ammonium salts, preferably, sodium salts.

The divalent salt of the bicyclo[2.2.1]heptane-2,3-dicarboxylic acid is preferably selected from calcium salts, magnesium salts and mixtures thereof. For example, the divalent salt of the bicyclo[2.2.1]heptane-2,3-dicarboxylic acid is selected from calcium salts and magnesium salts. Alternatively, the divalent salt of the bicyclo[2.2.1]heptane-2,3-dicarboxylic acid is preferably selected from calcium salts or magnesium salts, preferably calcium salts.

In one embodiment, the surface treated filler material product further comprises (c) at least one hydrophobising agent on at least a part of the accessible surface area of the calcium carbonate-comprising filler material, wherein the amount, in mg, of the at least one hydrophobising agent on the accessible surface area of the calcium carbonate-comprising filler material, in $m^2$, is from 0.001 to 9 $mg/m^2$. Preferably, the surface treated filler material product further comprises (c) the at least one hydrophobising agent on the accessible surface area of the calcium carbonate-comprising filler material, in $m^2$, in an amount, in mg, from 0.01 to 8 $mg/m^2$ and more preferably from 0.1 to 4 $mg/m^2$.

The at least one hydrophobising agent may be any agent known to the skilled person which is capable to form a hydrophobic treatment layer on at least a part of the accessible surface area of the calcium carbonate-comprising filler material particles.

For example, the at least one hydrophobising agent is selected from the group consisting of
  i) an aliphatic carboxylic acid having a total amount of carbon atoms from $C_4$ to $C_{24}$ and/or reaction products thereof,
  ii) a mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or reaction products thereof, iii) a phosphoric acid ester blend of one or more phosphoric acid mono-ester and/or reaction products thereof and one or more phosphoric acid di-ester and/or reaction products thereof,
iv) a polyhydrogensiloxane and/or reaction products thereof,
v) an inert silicone oil and/or reaction products thereof,
vi) an aliphatic aldehyde and/or reaction products thereof, and mixtures of the materials according to i) to vi).

Preferably, the at least one hydrophobising agent is
i) an aliphatic carboxylic acid having a total amount of carbon atoms from $C_4$ to $C_{24}$ and/or reaction products thereof, or
ii) a mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or reaction products thereof, or
iii) a phosphoric acid ester blend of one or more phosphoric acid mono-ester and/or reaction products thereof and one or more phosphoric acid di-ester and/or reaction products thereof, or
iv) a polyhydrogensiloxane and/or reaction products thereof, or
v) an inert silicone oil and/or reaction products thereof, or
vi) an aliphatic aldehyde and/or reaction products thereof.

If the surface treated filler material product further comprises, in addition to the bicyclo[2.2.1]heptane-2,3-dicarboxylic acid and/or a monovalent salt of the bicyclo[2.2.1]heptane-2,3-dicarboxylic acid and/or a divalent salt of the bicyclo[2.2.1]heptane-2,3-dicarboxylic acid, an aliphatic carboxylic acid having a total amount of carbon atoms from C4 to C24 and/or reaction products thereof on at least a part of the accessible surface area of the calcium carbonate-comprising filler material, a suitable aliphatic carboxylic acid having a total amount of carbon atoms from C4 to C24 is for example an aliphatic linear or branched carboxylic acid having between 4 and 24 carbon atoms.

The term "reaction products" of the aliphatic carboxylic acid in the meaning of the present invention refers to products obtained by contacting the surface-treated filler material product with the aliphatic carboxylic acid. Said reaction products are formed between at least a part of the applied aliphatic carboxylic acid and reactive molecules located at the surface of the calcium carbonate-comprising filler material.

The aliphatic linear or branched carboxylic acid in the meaning of the present invention may be selected from one or more straight chain, branched chain, saturated, unsaturated and/or alicyclic carboxylic acids. Preferably, the aliphatic linear or branched carboxylic acid is a monocarboxylic acid, i.e. the aliphatic linear or branched carboxylic acid is characterized in that a single carboxyl group is present. Said carboxyl group is placed at the end of the carbon skeleton.

In one embodiment of the present invention, the aliphatic linear or branched carboxylic acid is selected from saturated unbranched carboxylic acids, that is to say the aliphatic linear or branched carboxylic acid is preferably selected from the group of carboxylic acids consisting of butanoic acid, pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosanoic acid, behenic acid, tricosanoic acid, lignoceric acid and mixtures thereof.

In another embodiment of the present invention, the aliphatic linear or branched carboxylic acid is selected from the group consisting of octanoic acid, decanoic acid, lauric acid, myristic acid, palmitic acid, stearic acid, arachidic acid and mixtures thereof. Preferably, the aliphatic linear or branched carboxylic acid is selected from the group consisting of myristic acid, palmitic acid, stearic acid and mixtures thereof.

For example, the aliphatic linear or branched carboxylic acid is stearic acid.

According to another embodiment of the present invention, the surface treated filler material product further comprises, in addition to the bicyclo[2.2.1]heptane-2,3-dicarboxylic acid and/or a monovalent salt of the bicyclo[2.2.1]heptane-2,3-dicarboxylic acid and/or a divalent salt of the bicyclo[2.2.1]heptane-2,3-dicarboxylic acid, a mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or reaction products thereof on at least a part of the accessible surface area of the calcium carbonate-comprising filler material.

Suitable mono-substituted succinic anhydrides and/or corresponding reaction products thereof are described in EP 2 722 368 A1 and EP 2 770 017 A1, which are thus incorporated herewith by references.

According to another embodiment of the present invention, the surface treated filler material product further comprises, in addition to the bicyclo[2.2.1]heptane-2,3-dicarboxylic acid and/or a monovalent salt of the bicyclo[2.2.1]heptane-2,3-dicarboxylic acid and/or a divalent salt of the bicyclo[2.2.1]heptane-2,3-dicarboxylic acid, a phosphoric acid ester blend of one or more phosphoric acid mono-ester and/or reaction products thereof and one or more phosphoric acid di-ester and/or reaction products thereof on at least a part of the accessible surface area of the calcium carbonate-comprising filler material.

Suitable phosphoric acid ester blends of one or more phosphoric acid mono-ester and/or reaction products thereof and one or more phosphoric acid di-ester and/or reaction products thereof are described in EP 2 722 368 A1 and EP 2 770 017 A1, which are thus incorporated herewith by references.

According to another embodiment of the present invention, the surface treated filler material product further comprises, in addition to the bicyclo[2.2.1]heptane-2,3-dicarboxylic acid and/or a monovalent salt of the bicyclo[2.2.1]heptane-2,3-dicarboxylic acid and/or a divalent salt of the bicyclo[2.2.1]heptane-2,3-dicarboxylic acid, a polyhydrogensiloxane and/or reaction products thereof on at least a part of the accessible surface area of the calcium carbonate-comprising filler material.

Suitable polyhydrogensiloxanes and corresponding reaction products thereof are described in EP 2 843 005 A1, which is thus incorporated herewith by reference.

According to another embodiment of the present invention, the surface treated filler material product further comprises, in addition to the bicyclo[2.2.1]heptane-2,3-dicarboxylic acid and/or a monovalent salt of the bicyclo[2.2.1]heptane-2,3-dicarboxylic acid and/or a divalent salt of the bicyclo[2.2.1]heptane-2,3-dicarboxylic acid, an inert silicone oil and/or reaction products thereof on at least a part of the accessible surface area of the calcium carbonate-comprising filler material.

For example, the inert silicone oil is preferably a polydimethylsiloxane (PDMS).

According to another embodiment of the present invention, the surface treated filler material product further comprises, in addition to the bicyclo[2.2.1]heptane-2,3-dicarboxylic acid and/or a monovalent salt of the bicyclo[2.2.1]heptane-2,3-dicarboxylic acid and/or a divalent salt of the bicyclo[2.2.1]heptane-2,3-dicarboxylic acid, an aliphatic aldehyde and/or reaction products thereof on at least a part of the accessible surface area of the calcium carbonate-comprising filler material.

Suitable aliphatic aldehydes and corresponding reaction products thereof are described in EP 2 390 285 A1, which is thus incorporated herewith by reference.

If the surface treated filler material product further comprises at least one hydrophobising agent on at least a part of the accessible surface area of the calcium carbonate-comprising filler material, the weight ratio of the bicyclo[2.2.1]heptane-2,3-dicarboxylic acid and/or a monovalent salt of the bicyclo[2.2.1]heptane-2,3-dicarboxylic acid and/or a divalent salt of the bicyclo[2.2.1]heptane-2,3-dicarboxylic acid to the at least one hydrophobising agent is preferably from 10:1 to 1:100, preferably from 1:1 to 1:25 and most preferably from 1:5 to 1:10.

For example, the weight ratio of the bicyclo[2.2.1]heptane-2,3-dicarboxylic acid and/or a monovalent salt of the bicyclo[2.2.1]heptane-2,3-dicarboxylic acid and/or a divalent salt of the bicyclo[2.2.1]heptane-2,3-dicarboxylic acid to the at least one hydrophobising agent is from 1:10 to 1:17, like from 1:1.3 to 1:15.

It is appreciated that the surface treated filler material product effectively affects the α-nucleation of polyolefins. In particular, the surface treated filler material product affects early crystallization and thus allows faster post processing, such as injection moulding, thermoforming, blow moulding and the like, of the fresh plastic product.

In one embodiment, the polyolefin is a homopolymer and/or copolymer of a polyolefin. For example, the polyolefin is a homopolymer and a copolymer of a polyolefin. Alternatively, the polyolefin is a homopolymer or a copolymer of a polyolefin.

It is appreciated that the polyolefin is preferably a homopolymer of a polyolefin.

For example, the polyolefin can be polyethylene and/or polypropylene and/or polybutylene. Preferably, the polyolefin is selected from the group consisting of polypropylene, polyethylene and mixtures thereof. More preferably, the polyolefin is polypropylene.

If the polyolefin is polyethylene, the polyolefin is preferably selected from the group comprising homopolymers and/or copolymers of polyethylene like high-density polyethylene (HDPE), medium-density polyethylene (MDPE), low-density polyethylene (LDPE), very low-density polyethylene (VLDPE) and linear low-density polyethylene (LLDPE).

For example, the polyolefin is a homopolymer and/or copolymer of polyethylene.

The expression homopolymer of polyethylene used in the present invention relates to polyethylene comprising a polyethylene that consists substantially, i.e. of more than 99.7 wt.-%, still more preferably of at least 99.8 wt.-%, based on the total weight of the polyethylene, of ethylene units. For example, only ethylene units in the homopolymer of polyethylene are detectable.

In case the polyolefin is a copolymer of polyethylene, it is appreciated that the polyethylene contains units derivable from ethylene as major components. Accordingly, the copolymer of polyethylene comprises at least 55 wt.-% units derivable from ethylene, more preferably at least 60 wt.-% of units derived from ethylene, based on the total weight of the polyethylene. For example, the copolymer of polyethylene comprises 60 to 99.5 wt.-%, more preferably 90 to 99 wt.-%, units derivable from ethylene, based on the total weight of the polyethylene. The comonomers present in such copolymer of polyethylene are $C_3$ to $C_{10}$ α-olefins, preferably 1-butene, 1-hexene and 1-octene, the latter especially preferred.

Additionally or alternatively, the polyolefin is a homopolymer and/or copolymer of polypropylene.

The expression homopolymer of polypropylene as used throughout the instant invention relates to a polypropylene that consists substantially, i.e. of more than 99 wt.-%, still more preferably of at least 99.5 wt.-%, like of at least 99.8 wt.-%, based on the total weight of the polypropylene, of propylene units. In a preferred embodiment only propylene units are detectable in the homopolymer of polypropylene.

In case the polyolefin is a copolymer of polypropylene, the polypropylene preferably contains units derivable from propylene as major components. The copolymer of polypropylene preferably comprises, preferably consists of, units derived from propylene and $C_2$ and/or at least one $C_4$ to $C_{10}$ α-olefin. In one embodiment of the present invention, the copolymer of polypropylene comprises, preferably consists of, units derived from propylene and at least one α-olefin selected from the group consisting of ethylene, 1-butene, 1-pentene, 1-hexene and 1-octene. For example, the copolymer of polypropylene comprises, preferably consists of, units derived from propylene and ethylene. In one embodiment of the present invention, the units derivable from propylene constitutes the main part of the polypropylene, i.e. at least 60 wt.-%, preferably of at least 70 wt.-%, more preferably of at least 80 wt.-%, still more preferably of from 60 to 99 wt.-%, yet more preferably of from 70 to 99 wt.-% and most preferably of from 80 to 99 wt.-%, based on the total weight of the polypropylene. The amount of units derived from $C_2$ and/or at least one $C_4$ to $C_{10}$ α-olefin in the copolymer of polypropylene, is in the range of 1 to 40 wt.-%, more preferably in the range of 1 to 30 wt.-% and most preferably in the range of 1 to 20 wt.-%, based on the total weight of the copolymer of polypropylene.

If the copolymer of polypropylene comprises only units derivable from propylene and ethylene, the amount of ethylene is preferably in the range of 1 to 20 wt.-%, preferably in the range of 1 to 15 wt.-% and most preferably in the range of 1 to 10 wt.-%, based on the total weight of the copolymer of polypropylene. Accordingly, the amount of propylene is preferably in the range of 80 to 99 wt.-%, preferably in the range of 85 to 99 wt.-% and most preferably in the range of 90 to 99 wt.-%, based on the total weight of the copolymer of polypropylene.

Additionally or alternatively, the polyolefin is a homopolymer and/or copolymer of polybutylene.

The expression homopolymer of polybutylene as used throughout the instant invention relates to a polybutylene that consists substantially, i.e. of more than 99 wt.-%, still more preferably of at least 99.5 wt.-%, like of at least 99.8 wt.-%, based on the total weight of the polybutylene, of butylene units. In a preferred embodiment only butylene units are detectable in the homopolymer of polybutylene.

In case the polyolefin is a copolymer of polybutylene, the polybutylene preferably contains units derivable from butylene as major components. The copolymer of polybutylene preferably comprises, preferably consists of, units derived from butylene and $C_2$ and/or $C_3$ and/or at least one $C_5$ to $C_{10}$ α-olefin. In one embodiment of the present invention, the copolymer of polybutylene comprises, preferably consists of, units derived from butylene and at least one α-olefin selected from the group consisting of ethylene, 1-propene, 1-pentene, 1-hexene and 1-octene. For example, the copolymer of polybutylene comprises, preferably consists of, units derived from butylene and ethylene. In one embodiment of the present invention, the units derivable from butylene constitutes the main part of the polybutylene, i.e. at least 60 wt.-%, preferably of at least 70 wt.-%, more preferably of at least 80 wt.-%, still more preferably of from 60 to 99 wt.-%, yet more preferably of from 70 to 99 wt.-% and most preferably of from 80 to 99 wt.-%, based on the total weight of the polybutylene. The amount of units derived from $C_2$ and/or $C_3$ and/or at least one $C_5$ to $C_{10}$ α-olefin in the copolymer of polybutylene, is in the range of 1 to 40 wt.-%, more preferably in the range of 1 to 30 wt.-% and most preferably in the range of 1 to 20 wt.-%, based on the total weight of the copolymer of polybutylene.

In one embodiment of the present invention, the surface treated filler material product has been obtained by a process as described below.

Process for the Preparation of the Surface Treated Filler Material Product

According to another aspect of the present invention, a process for the preparation of the surface treated filler material product, as defined above, is provided. The process comprises the steps of:

(i) providing a calcium carbonate-comprising filler material, (ii) providing a bicyclo[2.2.1]heptane-2,3-dicarboxylic acid and/or a monovalent salt of the bicyclo[2.2.1]heptane-2,3-dicarboxylic acid and/or a divalent salt of the bicyclo[2.2.1]heptane-2,3-dicarboxylic acid, (iii) contacting the calcium carbonate-comprising filler material and the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid at a temperature in the range from 157 to 300° C.

With regard to the surface treated filler material product prepared by the process, the calcium carbonate-comprising filler material provided in step (i) the bicyclo[2.2.1]heptane-2,3-dicarboxylic acid and/or monovalent salt of the bicyclo[2.2.1]heptane-2,3-dicarboxylic acid and/or divalent salt of the bicyclo[2.2.1]heptane-2,3-dicarboxylic acid provided in step (ii), it is referred to the definitions set out above when defining the surface treated filler material product, the calcium carbonate-comprising filler material, the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid.

In one embodiment of the present invention, the calcium carbonate-comprising filler material provided in step (i) is a dried calcium carbonate-comprising filler material. That is to say, the calcium carbonate-comprising filler material provided in step (i) is dried at a temperature of from 100 to 220° C., preferably of from 120 to 200° C. and most preferably of from 140 to 180° C. before contacting step (iii) is carried out. The calcium carbonate-comprising filler material of contacting step (iii) is thus preferably a dried calcium carbonate-comprising filler material.

Preferably, such drying is carried out for a period of 2 hours or more, preferably for a period of 4 hours or more, and most preferably from 4 hours to 24 hours.

The bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid provided in step (ii) can be bicyclo[2.2.1]heptane-2,3-dicarboxylic acid and the monovalent salt of the bicyclo[2.2.1]heptane-2,3-dicarboxylic acid and the divalent salt of the bicyclo[2.2.1]heptane-2,3-dicarboxylic acid.

In an alternative embodiment, bicyclo[2.2.1]heptane-2,3-dicarboxylic acid and the monovalent salt of the bicyclo[2.2.1]heptane-2,3-dicarboxylic acid and/or the divalent salt of the bicyclo[2.2.1]heptane-2,3-dicarboxylic acid are provided in step (ii). For example, bicyclo[2.2.1]heptane-2,3-dicarboxylic acid and the monovalent salt of the bicyclo[2.2.1]heptane-2,3-dicarboxylic acid are provided in step (ii). Alternatively, bicyclo[2.2.1]heptane-2,3-dicarboxylic acid and the divalent salt of the bicyclo[2.2.1]heptane-2,3-dicarboxylic acid are provided in step (ii).

Alternatively, bicyclo[2.2.1]heptane-2,3-dicarboxylic acid or the monovalent salt of the bicyclo[2.2.1]heptane-2,3-dicarboxylic acid or the divalent salt of the bicyclo[2.2.1]heptane-2,3-dicarboxylic acid is provided in step (ii).

For example, the bicyclo[2.2.1]heptane-2,3-dicarboxylic acid is provided in step (ii). Alternatively, the monovalent salt of the bicyclo[2.2.1]heptane-2,3-dicarboxylic acid or the divalent salt of the bicyclo[2.2.1]heptane-2,3-dicarboxylic acid, preferably the divalent salt of the bicyclo[2.2.1]heptane-2,3-dicarboxylic acid, is provided in step (ii).

It is appreciated that the "monovalent salt of the bicyclo[2.2.1]heptane-2,3-dicarboxylic acid and/or divalent salt of the bicyclo[2.2.1]heptane-2,3-dicarboxylic acid" which can be present on at least a part of the accessible surface area of the calcium carbonate-comprising filler material is/are preferably obtained by contacting the calcium carbonate-comprising filler material with the bicyclo[2.2.1]heptane-2,3-dicarboxylic acid. Said monovalent salt of the bicyclo[2.2.1]heptane-2,3-dicarboxylic acid and/or a divalent salt of the bicyclo[2.2.1]heptane-2,3-dicarboxylic acid is/are preferably formed between at least a part of the applied bicyclo[2.2.1]heptane-2,3-dicarboxylic acid and reactive molecules located at the surface of the calcium carbonate-comprising filler material.

Thus, it is preferred that the bicyclo[2.2.1]heptane-2,3-dicarboxylic acid is provided in step (ii).

The step of contacting the calcium carbonate-comprising filler material and the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid in step c) preferably takes place under mixing conditions. The skilled man will adapt these mixing conditions (such as the configuration of mixing pallets and mixing speed) according to his process equipment.

In one embodiment of the present invention, the process may be a continuous process. In this case, it is possible to contact the calcium carbonate-comprising filler material with the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid in a constant flow such that a constant concentration of the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid is provided during the step of contacting.

Alternatively, the calcium carbonate-comprising filler material is contacted with the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid in one step, wherein said bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid is preferably added in one portion.

In another embodiment, the inventive process may be a batch process, i.e. the calcium carbonate-comprising filler material is contacted with the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid in more than one step, wherein said bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid is preferably added in about equal portions. Alternatively, it is also possible to add the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid in unequal portions to the calcium carbonate-comprising filler material, i.e. in larger and smaller portions.

According to one embodiment of the present invention, contacting step (iii) is carried out in one or more step(s) for a period of time of 20 min or less. For example, contacting step (iii) is carried out in one step and the total contacting time is 20 min or less, preferably 15 min or less, and most preferably from 1 second to 15 min.

It is appreciated that the temperature during contacting step (iii) is preferably adjusted such that the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid is liquid.

A "liquid" state in the meaning of the present invention is defined as the state in which a material is entirely liquid, in other words is entirely melted. Whereas the phenomenon of melting occurs at constant temperature on application of energy, a substance is qualified as being molten as of the moment following melting when the temperature begins to rise, as observed on a curve plotting temperature versus energy input obtained by Dynamic Scanning Calorimetry, DSC (DIN 51005: 1983-11).

The liquid state of the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid is advantageous as it can be more homogeneously located on at least a part of the accessible surface area of the calcium carbonate-comprising filler material of step (i). It is thus one requirement of the present invention that the contacting of the calcium carbonate-comprising filler material of step (i) with the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid of step (ii) in contacting step (iii) is carried out at a temperature in the range from 157 to 300° C. In one embodiment of the present invention, contacting step (iii) is carried out at a temperature in the range from 157 to 250° C., more preferably from 157 to 200° C. and most preferably from 157 to 180° C.

It is appreciated that the temperature of contacting step (iii) preferably refers to the temperature of the calcium carbonate-comprising filler material in contacting step (iii).

The treatment time for carrying out the contacting of the calcium carbonate-comprising filler material of step (i) with the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid of step (ii) in step (iii) is carried out for a period of 20 min or less, preferably for a period of 15 min or less, and most preferably from 1 second to 15 min.

In one embodiment, contacting step (iii) is preferably carried out by dry mixing the calcium carbonate-comprising filler material of step (i) with the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid of step (ii). In this embodiment, the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid is preferably provided as undiluted compound.

In one embodiment, contacting step (iii) is carried out by contacting a dried calcium carbonate-comprising filler material with the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid. If a dried calcium carbonate-comprising filler material is used in contacting step (iii), the dried calcium carbonate-comprising filler material is preferably transferred directly to the mixing chamber, without cooling down the dried calcium carbonate-comprising filler material between drying and contacting step (iii). That is to say, contacting step (iii) is preferably carried out in a preheated mixing chamber.

Thus, contacting step (iii) is preferably carried out with a calcium carbonate-comprising filler material, preferably a dried calcium carbonate-comprising filler material, which is added into a preheated mixing chamber. For example, the mixing chamber is preheated to a temperature of from 157 to 300° C., preferably of from 157 to 250° C. and most preferably of from 157 to 200° C. before contacting step (iii) is carried out.

Preferably, such preheating is carried out for a period of 45 min or less, preferably for a period of 30 min or less, and most preferably from 5 min to 30 min. The temperature and time period of the preheating preferably refers to the temperature and time period adjusted in the mixing chamber before contacting step (iii) is carried out. Said temperature and time period ensures that the mixing chamber provides a sufficient temperature for carrying out contacting step (iii).

In one embodiment, the dried calcium carbonate-comprising filler material is directly contacted with the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid, i.e. without cooling between drying and contacting step (iii). Thus, in this embodiment the calcium carbonate-comprising filler material has a temperature of from 157 to 300° C., preferably of from 157 to 250° C. and most preferably of from 157 to 200° C. when contacting step (iii) is carried out. The calcium carbonate-comprising filler material of contacting step (iii) is thus preferably a dried calcium carbonate-comprising filler material. This embodiment has the advantage that the calcium carbonate-comprising filler material has an even temperature such that a treatment layer comprising the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid can be evenly formed on the surface of the calcium carbonate-comprising filler material particles in contacting step (iii).

In one embodiment, the dried calcium carbonate-comprising filler material is added into a preheated mixing chamber.

If the calcium carbonate-comprising filler material is dried and added into a preheated mixing chamber, it is appreciated that the drying can be carried out at a temperature of from 100 to 220° C., preferably of from 120 to 200° C. and most preferably of from 140 to 180° C., e.g. for a period of 2 hours or more, preferably for a period of 4 hours or more, and most preferably from 4 hours to 24 hours, and the preheating of the mixing chamber is carried out at a temperature of from 157 to 300° C., preferably of from 157 to 250° C. and most preferably of from 157 to 200° C., e.g. for a period of 45 min or less, preferably for a period of 30 min or less, and most preferably from 5 min to 30 min.

If the calcium carbonate-comprising filler material is dried and added into a preheated mixing chamber, the dried calcium carbonate-comprising filler material is preferably added into the preheated mixing chamber without cooling the dried calcium carbonate-comprising filler material between drying and contacting step (iii). Thus, the dried calcium carbonate-comprising filler material having a temperature of from 100 to 220° C., preferably of from 120 to 200° C. and most preferably of from 140 to 180° C. is preferably added into the preheated mixing chamber at a temperature of from 157 to 300° C., preferably of from 157 to 250° C. and most preferably of from 157 to 200° C.; i.e. without cooling the dried calcium carbonate-comprising filler material between drying and contacting step (iii). This embodiment has the advantage that the calcium carbonate-comprising filler material has an even temperature such that a treatment layer comprising the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid can be evenly formed on the surface of the calcium carbonate-comprising filler material particles in contacting step (iii).

In an alternative embodiment, the dried calcium carbonate-comprising filler material is subjected to a cooling step before contacting step (iii) is carried out. Thus, the dried calcium carbonate-comprising filler material having a temperature of from 100 to 220° C., preferably of from 120 to 200° C. and most preferably of from 140 to 180° C. is preferably subjected to a cooling, preferably to room temperature, followed by adding the dried calcium carbonate-comprising filler material into the preheated mixing chamber at a temperature of from 157 to 300° C., preferably of from 157 to 250° C. and most preferably of from 157 to 200° C. This embodiment has the advantage that the dried calcium carbonate-comprising filler material can be stored before contacting step (iii) is carried out such that contacting step (iii) can be carried out in a time-efficient manner.

Thus, contacting step (iii) can be carried out by contacting a dried calcium carbonate-comprising filler material with the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid at a temperature in the range from 157 to 300° C.

Alternatively, contacting step (iii) is carried out by contacting a dried calcium carbonate-comprising filler material with the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid at a temperature in the range from 157 to 300° C.

Alternatively, contacting step (iii) is carried out by contacting a dried calcium carbonate-comprising filler material with the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid at a temperature in the range from 157 to 300° C. in a preheated mixing chamber.

In one embodiment, the process further comprises a step of
(iv) drying the surface treated filler material product after step (iii), at a temperature in the range from 60 to 200° C., preferably until the moisture content of the surface treated filler material product is in the range from 0.01 to 0.2 wt.-%, based on the total weight of the dried surface treated filler material product.

In said drying step (iv), the surface treated filler material product obtained in contacting step (iii) is dried to obtain a dried surface treated filler material product.

Preferably, the drying step (iv) is carried out after contacting step (iii).

In general, the drying step (iv) according to the present invention may be carried out by any thermal drying method known to the skilled person for drying materials in the range from 98.0 to 99.99 wt.-%, based on the total weight of the material.

If the process comprises a drying step (iv), it is appreciated that the drying step is carried out such that the obtained dried surface treated filler material product has a moisture content being below the moisture content of the surface treated filler material product obtained in step (iii).

According to one embodiment, the drying step (iv) is carried out in a cell mill as known by the skilled person. Preferably said drying step is carried out at a temperature ranging from 60 and 200° C., preferably from 70 to 180° C. and most preferably from 80 to 175° C.

Additionally or alternatively, the process further comprises a step of
(v) treating the calcium carbonate-comprising filler material before and/or during and/or after step (iii) or the surface treated filler material product obtained in step (iv) in one or more steps with at least one hydrophobising agent at a temperature from 30 to 200° C., wherein the at least one hydrophobising agent is added in an amount such that the amount, in mg, of the at least one hydrophobising agent on the accessible surface area of the calcium carbonate-comprising filler material, in m$^2$, is from 0.001 to 9 mg/m$^2$.

In one embodiment, the at least one hydrophobising agent is added in treating step (iv) in an amount such that the amount, in mg, of the at least one hydrophobising agent on the accessible surface area of the calcium carbonate-comprising filler material, in m$^2$, is preferably from 0.01 to 8 mg/m$^2$ and more preferably from 0.1 to 4 mg/m$^2$.

In this embodiment, the inventive process comprises contacting the calcium carbonate-comprising filler material before and/or during and/or after step (iii) or the surface treated filler material product obtained in step (iv) with at least one hydrophobising agent being selected from the group consisting of an aliphatic carboxylic acid having a total amount of carbon atoms from $C_4$ to $C_{24}$, a mono-substituted succinic anhydride consisting of succinic anhydride mono-substituted with a group selected from a linear, branched, aliphatic and cyclic group having a total amount of carbon atoms from at least $C_2$ to $C_{30}$ in the substituent, a phosphoric acid ester blend of one or more phosphoric acid mono-ester and one or more phosphoric acid di-ester, a polyhydrogensiloxane, an inert silicone oil, preferably polydimethylsiloxane, an aliphatic aldehyde, and mixtures thereof.

With regard to the aliphatic carboxylic acid, the mono-substituted succinic anhydride, the phosphoric acid ester blend, the polyhydrogensiloxane, the inert silicone oil and the aliphatic aldehyde it is referred to the definitions set out above when defining the aliphatic carboxylic acid, the mono-substituted succinic anhydride, the phosphoric acid ester blend, the polyhydrogensiloxane, the inert silicone oil and the aliphatic aldehyde.

If the inventive process comprises treating step (v), treating step (v) is preferably carried out before and/or during and/or after contacting step (iii) or after drying step (iv).

In one embodiment, treating step (v) is preferably carried out before or during or after contacting step (iii) or after drying step (iv). For example, treating step (v) is carried out during or after contacting step (iii) or after drying step (iv), preferably during contacting step (iii) or after contacting step (iii), more preferably during contacting step (iii).

In case treating step (v) is carried out during contacting step (iii), the surface treatment agent, i.e. the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid, is preferably added in an admixture with the at least one hydrophobising agent.

Treating step (v) is preferably carried out the temperature at which contacting step (iii) is carried out.

Preferably, the at least one hydrophobising agent is added as pure compound, i.e. in the undiluted form.

It is appreciated that the weight ratio of the bicyclo[2.2.1]heptane-2,3-dicarboxylic acid and/or a monovalent salt of the bicyclo[2.2.1]heptane-2,3-dicarboxylic acid and/or a divalent salt of the bicyclo[2.2.1]heptane-2,3-dicarboxylic acid to the at least one hydrophobising agent added before and/or during and/or after contacting step (iii) or after drying step (iv) is preferably from 10:1 to 1:100. For example, the weight ratio of the bicyclo[2.2.1]heptane-2,3-dicarboxylic acid and/or a monovalent salt of the bicyclo[2.2.1]heptane-2,3-dicarboxylic acid and/or a divalent salt of the bicyclo[2.2.1]heptane-2,3-dicarboxylic acid to the at least one hydrophobising agent added before and/or during and/or after contacting step (iii) or after drying step (iv) is preferably from 1:1 to 1:25 and most preferably from 1:5 to 1:10.

In one embodiment of the present invention, the weight ratio of the bicyclo[2.2.1]heptane-2,3-dicarboxylic acid and/or a monovalent salt of the bicyclo[2.2.1]heptane-2,3-dicarboxylic acid and/or a divalent salt of the bicyclo[2.2.1]heptane-2,3-dicarboxylic acid to the at least one hydrophobising agent added before and/or during and/or after contacting step (iii) or after drying step (iv) is preferably from 1:10 to 1:17, like from 1:1.3 to 1:15.

If present, treating step (v) preferably takes place under mixing conditions. The skilled man will adapt these mixing conditions (such as the configuration of mixing pallets and mixing speed) according to his process equipment.

In one embodiment of the present invention, it is possible to contact the calcium carbonate-comprising filler material before and/or during and/or after step (iii) or the surface treated filler material product obtained in step (iv) with the at least one hydrophobising agent in a constant flow such that a constant concentration of the hydrophobising agent is provided in treating step (v).

Alternatively, the calcium carbonate-comprising filler material before and/or during and/or after step (iii) or the surface treated filler material product obtained in step (iv) is contacted with the at least one hydrophobising agent in one step, wherein said hydrophobising agent is preferably added in one portion in treating step (v).

In another embodiment, the inventive process may be a batch process, i.e. the calcium carbonate-comprising filler material before and/or during and/or after step (iii) or the surface treated filler material product obtained in step (iv) is contacted with the at least one hydrophobising agent in more than one step, wherein said hydrophobising agent is preferably added in about equal portions in treating step (v). Alternatively, it is also possible to add the at least one hydrophobising agent in unequal portions to the calcium carbonate-comprising filler material before and/or during and/or after step (iii) or the surface treated filler material product obtained in step (iv), i.e. in larger and smaller portions.

Thus, it is appreciated that the surface treated filler material product obtained in treating step (v) comprises on at least a part of the accessible surface area of the calcium carbonate-comprising filler material the bicyclo[2.2.1]heptane-2,3-dicarboxylic acid and/or a monovalent salt of the bicyclo[2.2.1]heptane-2,3-dicarboxylic acid and/or a divalent salt of the bicyclo[2.2.1]heptane-2,3-dicarboxylic acid and the optional at least one hydrophobising agent.

Products and Uses

In view of the very good results of the surface treated filler material product, as defined above, as alpha-nucleating agent, a further aspect of the present invention refers to the use of the surface treated filler material product as an alpha-nucleating agent for polyolefins, preferably for polypropylene.

With regard to the surface treated filler material product and the polyolefin, it is referred to the definitions set out above when defining the surface treated filler material product and the polyolefin.

Another aspect of the present invention refers to a master batch comprising the surface treated filler material product, as defined herein, and a polyolefin.

With regard to the surface treated filler material product and the polyolefin, it is referred to the definitions set out above when defining the surface treated filler material product and the polyolefin.

The term "master batch" refers to a composition having a concentration of the surface treated filler material product that is higher than the concentration in the polyolefin composition that is typically used for preparing the final plastic product. That is to say, the master batch is further diluted such as to obtain a polyolefin composition which is suitable for preparing the final plastic product.

For example, the master batch comprises the surface treated filler material product in an amount of from >55 to 85 wt.-%, preferably from 60 to 85 wt.-% and more preferably from 70 to 80 wt.-%, based on the total weight of the master batch. A master batch can be prepared by a method comprising steps (i) to (iii) and optionally steps (iv) and/or (v) as defined above and a further step (I) of incorporating >55 to 90 wt.-% and preferably 60 to 80 wt.-% of the surface treated filler material product obtained after step (iii), (iv) or (v) into a polyolefin.

It is preferred that the polyolefin of the master batch is selected from the group consisting of polypropylene, polyethylene and mixtures thereof, preferably polypropylene.

The surface treated filler material product can be added to the polyolefin by any appropriate mixing method known to the skilled person, e.g. by melt-mixing in an extruder, preferably a single-screw or a twin-screw extruder, continuous kneaders such as Farrell-type kneaders, or discontinuous mixers, such as a Banbury mixer.

Another aspect of the present invention thus refers to a polyolefin composition comprising the surface treated filler material product, as defined herein.

As already mentioned above, the polyolefin composition which is suitable for preparing the final plastic product is obtained by diluting the master batch.

Alternatively the polyolefin composition can be prepared by a process comprising steps (i) to (iii) optionally steps (iv) and/or (v) as defined above and a further step (I) of incorporating 0.01 wt.-% to 55 wt.-% of the surface treated filler material product obtained after step (iii), (iv) or (v) into a polyolefin.

In one embodiment of the present invention, the polyolefin composition used for preparing the final plastic product comprises the surface treated filler material product in an amount of from 0.01 wt.-% to 55 wt.-%, preferably from 0.05 wt.-% to 30 wt.-%, more preferably from 0.075 wt.-% to 20 wt.-%, and most preferably from 0.1 wt.-% to 5 wt.-%, based on the total weight of the polyolefin composition.

It is preferred that the polyolefin of the polyolefin composition is selected from the group consisting of polypropylene, polyethylene and mixtures thereof, preferably polypropylene.

It is appreciated that the polyolefin of the master batch and of the polyolefin composition is preferably the same. Thus, it is preferred that the polyolefin of the master batch and of the polyolefin composition is the same polyolefin selected from the group consisting of polypropylene, polyethylene and mixtures thereof, preferably polypropylene.

The master batch and/or the polyolefin composition may comprise at least one additive.

The term "additive" covers also additives which are provided as a master batch containing the polyolefin as carrier material as described above. However the term "additive" does not cover α-nucleating agents, i.e. the surface treated filler material product according to the present invention. Typical additives are acid scavengers, antioxidants such as phenolic antioxidant and/or the hindered amine light stabilizer, colorants, pigments such as talc and calcium carbonate, anti-scratch agents, dispersing agents and carriers.

The term "at least one" additive in the meaning of the present invention means that the additive comprises, preferably consists of, one or more additive(s).

In one embodiment of the present invention, the at least one additive comprises, preferably consists of, one additive. Alternatively, the at least one additive comprises, preferably consists of, a mixture of two or more additives. For example, the at least one antioxidant comprises, preferably consists of, a mixture of two or three antioxidants.

Preferably, the at least one additive comprises, more preferably consists of, a mixture of two or more additives.

In one embodiment, the polyolefin composition further comprises calcium carbonate as additive and optionally further additives. If the polyolefin composition comprises calcium carbonate, the calcium carbonate is preferably present in an amount from 0.1 to 50 wt.-%, more preferably from 0.1 to 40 wt.-% and most preferably from 0.3 to 10 wt.-%, based on the total weight of the polyolefin composition.

It is appreciated that the calcium carbonate added as additive differs from the surface treated filler material product of the present invention. In particular, it is preferred that the calcium carbonate added as additive is free of a bicyclo [2.2.1]heptane-2,3-dicarboxylic acid and/or a monovalent salt of the bicyclo[2.2.1]heptane-2,3-dicarboxylic acid and/ or a divalent salt of the bicyclo[2.2.1]heptane-2,3-dicarboxylic acid being present on at least a part of the accessible surface area of the calcium carbonate.

The surface treated filler material product according to the present invention imparts excellent mechanical properties to final plastic products. In particular, the surface treated filler material product imparts excellent mechanical properties such as the modulus and/or stress at yield to final plastic products, when the surface treated filler material product is provided in form of the polymer composition of the present invention.

Thus, the present invention refers in a further aspect to an article comprising the polyolefin composition. Additionally or alternatively, the present invention refers to an article comprising the surface treated filler material product, as defined herein.

With regard to the surface treated filler material product and the polyolefin composition, it is referred to the definitions set out above when defining the surface treated filler material product and the polyolefin composition.

It is appreciated that the article may be prepared by all techniques known in the art used for preparing plastic products. For example, the article of the present invention can be prepared by the well known blow-moulding process, injection moulding process thermoforming process, rotomoulding process, extrusion process, e.g. used for pipes or profiles, or processes used for preparing films and the like.

In one embodiment, the article is a film. The term "film" or "breathable film" is understood to refer to a sheet.

It is appreciated that the film and/or breathable film may be prepared by all techniques known in the art used for preparing such films. For example, the film of the present invention can be prepared by the well known techniques used for preparing stretched/oriented films, and preferably extrusion coating films, blown films, technical blown films, monotapes, cast films and the like.

Accordingly, articles according to the present invention are characterized in that they contain the inventive surface treated filler material product and in that they have improved material properties such as improved mechanical properties such as modulus and/or stress at yield.

Accordingly, the inventive surface treated filler material product is thus advantageously implemented as alpha-nucleating agent in a polyolefin composition comprising at least one polyolefin and from 0.01 wt.-% to 55 wt.-%, based on the total weight of the polyolefin composition, of the surface treated filler material product.

The article is preferably selected from the group comprising hygiene products, medical and healthcare products, filter products, geotextile products, agriculture and horticulture products, clothing, footwear and baggage products, household and industrial products, packaging products, like beverage containers, trays or plates, construction products, automotive articles and the like.

Preferably, the hygiene products are selected from the group comprising absorbent hygiene products such as baby diapers or nappies, feminine hygiene, adult incontinence products, depilatory strips, bandages and wound dressings, disposable bath and face towels, disposable slippers and footwear, top sheets or coverstocks, consumer face masks, leg cuffs, acquisition/distribution layers, core wraps, back sheets, stretch ears, landing zones, dusting layers and fastening systems; and wipes such as wet wipes, skin care wipes, baby wipes, facial wipes, cleansing wipes, hand and body wipes, moist towelettes, personal hygiene wipes, feminine hygiene wipes, antibacterial wipes and medicated wipes.

Preferably, the medical and healthcare products are selected from the group comprising medical products which can be sterilized, medical packaging, caps like surgical disposable caps, protective clothing, surgical gowns, surgical masks and face masks, surgical scrub suits, surgical covers, surgical drapes, wraps, packs, sponges, dressings, wipes, bed linen, contamination control gowns, examination gowns, lab coats, isolation gowns, transdermal drug delivery, shrouds, underpads, procedure packs, heat packs, ostomy bag liners, fixation tapes, incubator mattress, sterilisation wraps (CSR wrap), wound care, cold/heat packs, drug delivery systems like patches.

Preferably, the filter products are selected from the group comprising gasoline filters, oil filters, air filters, water filters, coffee filters, tea bags, pharmaceutical industry filters, mineral processing filters, liquid cartridge and bag filters, vacuum bags, allergen membranes and laminates with non-woven layers.

Preferably, the geotextile products are selected from the group comprising soil stabilizers and roadway underlayment, foundation stabilizers, erosion control, canals construction, drainage systems, geomembrane protection, frost protection, agriculture mulch, pond and canal water barriers, sand infiltration barrier for drainage tile and landfill liners.

Preferably, the agriculture and horticulture products are selected from the group comprising crop covers, plant protection, seed blankets, weed control fabrics, greenhouse shading, root control bags, biodegradable plant pots, capillary matting, and landscape fabric.

Preferably, the clothing, footwear and baggage products are selected from the group comprising interlinings like fronts of overcoats, collars, facings, waistbands, lapels etc., disposable underwear, shoe components like shoelace eyelet reinforcement, athletic shoe and sandal reinforcement and inner sole lining etc., bag components, bonding agents, composition and (wash) care labels.

Preferably, the packaging products are selected from the group comprising interlinings like desiccant packaging, sorbents packaging, gift boxes, file boxes, nonwoven bags, book covers, mailing envelopes, Express envelopes, courier bags and the like. As another example, the packaging products can be beverage containers, trays or plates.

Preferably, the household and industrial products are selected from the group comprising abrasives, bed linen like pocket cloth for pocket springs, separation layer, spring cover, top cover, quilt backing, duvet coverings, pillow cases etc., blinds/curtains, carpet/carpet backings like scatter rugs, carpet tiles, bath mats etc., covering and separation material, detergent pouches, fabric softener sheets, flooring, furniture/upholstery like inside lining, reverse fabric for cushions, dust cover, spring covering, pull strips etc., mops, table linen, tea and coffee bags, vacuum cleaning bags, wall-covering, wipes like household care wipes, floor care wipes, cleaning wipes, pet care wipes etc., automotive building, cable wrapping, civil engineering, filtration packaging, protective clothing, primary and secondary carpet backing, composites, marine sail laminates, table cover laminates, chopped strand mats, backing/stabilizer for machine embroidery, packaging where porosity is needed, insulation like fiberglass batting, pillows, cushions, padding like upholstery padding, batting in quilts or comforters, consumer and medical face masks, mailing envelopes, tarps, tenting and transportation (lumber, steel) wrapping, disposable clothing like foot coverings and coveralls, and weather resistant house wraps.

Preferably, the construction products are selected from the group comprising house wrap, asphalt overlay, road and railroad beds, golf and tennis courts, wallcovering backings, acoustical wall coverings, roofing materials and tile underlayment, soil stabilizers and roadway underlayment, foundation stabilizers, erosion control, canals construction, drainage systems, geomembrane protection, frost protection, agriculture mulch, pond and canal water barriers, and sand infiltration barriers for drainage tile.

The following examples may additionally illustrate the invention but are not meant to restrict the invention to the exemplified embodiments. The examples below show the efficiency of the inventive surface treated filler material product according to the present invention as alpha-nucleating agent for polyolefins:

EXAMPLES

Measurement Methods

The following measurement methods are used to evaluate the parameters given in the examples and claims.

Particle Size Distribution (Mass % Particles with a Diameter <X) and Weight Median Diameter ($d_{50}$) of a Particulate Material As used herein and as generally defined in the art, the "$d_{50}$" value is determined based on measurements made by using a Sedigraph™ 5100 or 5120 of Micromeritics Instrument Corporation (operating instrument software version 1.04) and is defined as the size at which 50% (the median point) of the particle volume or mass is accounted for by particles having a diameter finer than the specified value and the remaining 50% is coarser than the specified value.

The method and the instrument are known to the skilled person and are commonly used to determine the particle size distribution of fillers and pigments. The measurement is carried out in an aqueous solution of 0.1 wt.-% $Na_4P_2O_7$ and 0.05 wt.-% of a low molecular weight sodium polyacrylate dispersant. The samples are dispersed using a high speed stirrer and supersonics.

BET Specific Surface Area of a Material

Throughout the present document, the specific surface area (in $m^2/g$) of a particulate material was determined using the BET method (using nitrogen as adsorbing gas), which is well known to the skilled man (ISO 9277:1995). The total surface area (in $m^2$) of the particulate material is then obtained by multiplication of the specific surface area and the mass (in g) of the particulate material. The method and the instrument are known to the skilled person and are commonly used to determine the specific surface of particulate materials.

Moisture Content

The moisture content of the surface treated filler material product or calcium carbonate-comprising filler material is measured according to the Karl Fischer Coulometric titration method, desorbing the moisture in an oven at 220° C. and passing it continuously into the KF coulometer (Mettler Toledo coulometric KF Titrator C30, combined with Mettler oven DO 0337) using dry $N_2$ at 100 ml/min for 10 min. A calibration curve using water has to be made and a blind of 10 min gas flow without a sample has to be taken in account.

Coating Level

The total weight of the surface treatment agent on the total surface area of the filler can be determined, for example, by thermogravimetric analysis by mass loss between 105° C. to 400° C.

Crystallisation Onset Temperature (=COT)

The crystallisation onset temperature was tested as the initial crystallisation temperature according ISO 11357-7 by cooling down from 220° C. with a rate of 10K/min with aluminium crucibles. It was determined as the cross-point temperature of the tangent to the baseline and the tangent to the peak shoulder where the exothermic peak begins at the point of maximum gradient using the STARe Software (Version 11.00a (Build 4393) provided by Mettler-Toledo AG.

Dynamic Scanning Calorimetry

The Dynamic Scanning Calorimetry can be used for determining the melting temperature of the polyolefin. The DSC is carried out in accordance with DIN 51005: 1983-11.

Crystallinity Cooling

The relative crystallinity in % (=crystallinity cooling) was measured according to ISO 11357-7 by cooling down from 220° C. with a rate of 10K/min with aluminium crucibles.

goniometer, and a VANTEC-1 detector. Nickel-filtered Cu $K_\alpha$ radiation was employed in all experiments. The profiles were chart recorded automatically using a scan speed of 0.7° per minute in $2\vartheta$ (Omya XRD GV_7600). The resulting powder diffraction pattern can be classified using the DIFFRACsuite software packages EVA and SEARCH, based on reference patterns of the ICDD PDF 2 database (Omya XRD LTM_7603).

2 Starting Materials

For the experiments described in sections 3.1 to 3.3 the starting materials according to Table 1 have been used.

TABLE 1

Starting materials.

| Compound | Tradename | Supplier |
|---|---|---|
| $CaCO_3$ 1 (marble, Italy, $d_{50}$ = 1.7 µm, $d_{98}$ = 6.5 µm) | Omyacarb 1 - AV | Omya |
| $CaCO_3$ 2 (marble, Italy, $d_{50}$ = 1.6 µm, $d_{98}$ = 6 µm, surface treated) | Omyafilm 753 - OM | Omya |
| Bicyclo[2.2.1]heptane-2,3-dicarboxylic acid (mp. = 157° C.) = NOR | Product Number: N0753; CAS Number: 1724-08-09 | TCI Europe |
| Ca-salt of Bicyclo[2.2.1]heptane-2,3-dicarboxylic acid[a] | — | — |
| Na-salt of Bicyclo[2.2.1]heptane-2,3-dicarboxylic acid[a] | — | — |
| Pimelic acid | CAS Number 111-16-0 | Sigma-Aldrich |
| Talc | Finntalc M15 | Mondominerals |
| Stearic acid | Omyacid 39 | Omya Hamburg GmbH |
| Polypropylene 1 | Borealis BE 50 | Borealis |
| Polypropylene 2 | Borealis HF 136 MO | Borealis |
| Polypropylene 3 | Borealis HC 600 HF | Borealis |

[a] Synthesized by standard methods using NOR as starting material.

Stress at Yield (Injection Moulded Test Specimen)

The stress at yield has been determined according to ISO 527-2/1B/50 (Specimen Type 1B testing speed 50 mm/min, specimen were injection moulded).

E-Modulus (Injection Moulded Test Specimen)

The E-Modulus has been determined according to ISO 527-2/1B/50 (Specimen Type 1B, testing speed 1 mm/min, specimen were injection moulded).

E-Modulus (Sheet)

E-Modulus determination was performed according to ISO 527-2/1BA (Specimen width was 5 mm and the testing length 25 mm, test speed was 1 mm/min, specimen extruded with flat die and calendared and machined out of the sheet in machine direction, thickness 1 mm)

Yield Strength (Sheet)

Yield stress determination was performed according to ISO 527-2/1BA/50 (Specimen width was 5 mm and the testing length 25 mm, test speed was 590 mm/min, specimen extruded with flat die and calendared and machined out of the sheet in machine direction).

Top Load of a Thermoformed Box

The top load strength of the thermoformed box was tested in accordance with ASTM Standard D2659-95 on a Zwick materials testing machine Z020 with a fixed crosshead speed of 10.0 mm/minute.

XRD Measurements

Samples were analysed with a Bruker D8 Advance powder diffractometer obeying Bragg's law. This diffractometer consists of a 2.2 kW X-ray tube, a sample holder, a $\vartheta$-$\vartheta$ 3.1 Surface Treatment of Calcium Carbonate 1

The raw materials were dried overnight in a drying oven at a temperature of 160° C. Subsequently, the surface treatment of the calcium carbonate, i.e. the dry coating step, was carried out by using a MTI-Mixer (temperature depends on the surface treatment agent, see Table 2 (=T1)). The dried calcium carbonate 1 was directly filled from the oven into the preheated mixing chamber of the MTI-Mixer, without cooling down the dried calcium carbonate, where it was moved in a plug-like flow for 5 minutes at a speed of 1 500 rpm. The surface treatment agent was added to the mixing chamber and the obtained blend was mixed twice for a total time as given in Table 2 at 1 500 rpm at the temperature T1 as given in Table 2. The obtained surface treated filler material product was cooled down to the temperature (=T2) as given in Table 2, which corresponds to the temperature of the obtained surface treated filler material product in the mixing chamber of the MTI-Mixer.

TABLE 2

Processing conditions.

| Surface treatment agent | T1 [° C.] | Time [minutes] | T2 [° C.] |
|---|---|---|---|
| NOR | 195 | 10 | 135 |
| Stearic acid | 100 | 30 | 50 |
| Pimelic acid | 150 | 30 | 90 |
| NOR + Stearic acid[a] | 195 | 10 | 50 |

[a] ratios can be gathered from samples E8 and E9 of Table 5.

3.2 Preparation of Polypropylene-Master Batches

Polypropylene master batches were continuously prepared on a lab scale Buss kneader (PR46 from Buss AG, Switzerland). All ingredients were added with gravimetrical screw feeders. The mineral ingredients were fed to two side feeders in a ratio of 50:50. All other feeders were fed into the main hopper. The screw speed was set to 250 rpm. The throughput was 3 kg per hour. The barrel temperatures of the processing unit were ramped down from 200° C. to 170° C. The discharge barrel was set to 190° C. The obtained master batches were strand pelletized.

3.3 Adding the Master Batch to Polypropylene Formulations

The master batches were diluted according the final formulation by blending master batch pellets and virgin polymer pellets in a tumble mixer. The blend was subsequently fed into the inlet hopper of the processing machine.

3.4 Preparation of Polypropylene Compounds

Polypropylene compounds were diluted from the master batches prepared according to point 3.3 above on a Dr. Collin 30 mm×30D single screw extruder. The barrel temperatures were ramped up from 190° C. at the inlet to 245° C. at the die. The die temperature was set to 245° C. The obtained compounds were strand pelletized.

3.5 Thermoforming

For thermoforming trials 1 mm thick sheets were extruded on a Dr. Collin 30 mm×30D single screw extruder, with a 250 mm flat die. The sheets were calendared on a chill roll unit module A from Dr. Collin. The screw speed was approximately 130 rpm. The barrel temperatures were ramped up from 190° C. at the inlet to 245° C. at the die. The die temperature was set to 245° C. The chill roll temperature was set to 60° C. The roll speed was 1 m/min.

Thermoforming was done on a ILLIG UA100G stand alone vacuum station with upper infrared heaters. The samples were formed with a positive aluminium mould. From this mould boxes with approximately 5 cm height and 8 cm×4 cm width were formed no pre stretching punch and no pre blowing was used. The radiators had 600° C. the heating time was 32 seconds. The sheet temperature immediately before forming was approximately 155° C. The hot samples were then cooled with a blower for 12 seconds.

3.6 Stability Tests

Dry blending: Vorwerk Thermomix TM3

All ingredients of a formulation were filled into the mixing bowl. The standard mixing blade has been used. The formulation was then blended for 1 min at setting 3.

Melt compounding: Haake Rheomix 600 OS

The Rheomix was preheated to 190° C. for 30 min before the first formulation was mixed. The mixer has been started with 50 rpm of the standard roller rotors. The dry blended formulation was then filled immediately into the hopper of the mixing chamber and the chamber was closed with the plunger. After a mixing time of 3 minutes at 190° C. the mixer was stopped, the mixing chamber was opened and the melt compounded sample was taken out and cooled at 23° C. for 30 minutes. Now the chamber was cleaned manually before reassembling. After that the next formulation was mixed accordingly.

Melt Compression: Collin Press P 300 P

The Press was heated to 200° C. The melt was mixed and the cooled sample was put into the press between two aluminum plates and a mold plate with 4 mm thickness. Then a pressure of 10 bar was applied for 80 seconds. The Pressure was then increased to 200 bar for 2 minutes. Then the press was opened and the cooling cassette which was set to 12° C. was driven in and the press was closed again with a pressure of 200 bar. The sample was cooled this way for 3 minutes. The sample sheets were then removed from the mold and a disk with 4 cm diameter was punched out with an according punching tool.

4 Results

4.1 Crystallisation Onset Temperature (=COT)

The polypropylene compounds as summarized in Table 3 have been prepared by using the procedure as given under point 3.4, polypropylene 1 according to Table 1 has been used.

TABLE 3

Crystallization onset temperature of polypropylene compounds.

| | Additive/Filler | | Surface treatment agent | | |
| --- | --- | --- | --- | --- | --- |
| No. | Kind | Amount [wt.-][a] | Kind | Amount [wt.-%][b] | COT [° C.] |
| CE1 | — | — | — | — | 120 |
| CE2 | CaCO$_3$ 1 | 1 | — | — | 120 |
| CE3 | CaCO$_3$ 1 | 1 | Stearic acid | 1 | 120 |
| CE4 | CaCO$_3$ 1 | 1 | Pimelic Acid | 1 | 128 |
| CE5 | NOR | 0.01 | — | — | 126 |
| CE6 | Ca-salt of NOR | 0.01 | — | — | 130 |
| CE7 | Na-salt of NOR | 0.01 | — | — | 127 |
| CE8 | CaCO$_3$ 1 NOR | 1 0.01 | — | — | 131 |
| CE9 | CaCO$_3$ 1 Ca-salt of NOR[c] | 1 0.01 | — | — | 130 |
| E1 | CaCO$_3$ 1 | 1 | NOR | 1 | 134 |

[a]Amount of additive/filler based on the weight of the polypropylene composition;
[b]Amount of surface treatment agent based on the weight of the filler;
[c]Obtained by co-extruding.

As can be gathered from Table 3 a polypropylene compound comprising the surface treated filler material product according to the present invention (E1) has a higher crystallization onset temperature than a polypropylene compound comprising other untreated (CE2) or surface treated fillers (CE3 and CE4) or a surface treatment agent alone (CE5, CE6 and CE7). Furthermore, the crystallization onset temperature of a polypropylene compound according to the present invention is higher than the crystallization onset temperature of a polypropylene compound comprising a mixture of a filler and a surface treatment agent wherein no surface treatment of the filler has been carried out (CE8 and CE9).

The polypropylene compounds as summarized in Table 4 have been prepared by using the procedure as given under point 3.4, polypropylene 1 according to Table 1 has been used.

TABLE 4

Crystallization onset temperature of polypropylene compounds.

| No. | Additive/Filler Kind | Amount [wt.-%]$^a$ | Surface treatment agent Kind | Amount [wt.-%]$^b$ | Amount active substance [wt.-%] | COT [° C.] |
|---|---|---|---|---|---|---|
| CE10 | Ca-salt of NOR | 0.01 | — | — | 0.01 | 130 |
| CE11 | Ca-salt of NOR | 0.1 | — | — | 0.1 | 133 |
| CE12 | Ca-salt of NOR | 1 | — | — | 1 | 136 |
| E2 | CaCO$_3$ 1 | 0.1 | NOR | 1 | 0.001 | 130 |
| E3 | CaCO$_3$ 1 | 1 | NOR | 1 | 0.01 | 134 |
| E4 | CaCO$_3$ 1 | 2 | NOR | 1 | 0.02 | 135 |
| E5 | CaCO$_3$ 1 | 5 | NOR | 1 | 0.05 | 136 |
| E6 | CaCO$_3$ 1 | 10 | NOR | 1 | 0.1 | 137 |

$^a$Amount of additive/filler based on the weight of the polypropylene composition;
$^b$Amount of surface treatment agent based on the weight of the filler.

Table 4 shows a comparison of the crystallization onset temperatures of polypropylene compounds comprising the calcium salt of bicyclo[2.2.1]heptane-2,3-dicarboxylic acid (CE10 to CE12) and between polypropylene compounds comprising the surface treated filler material product according to the present invention (E2 to E6). At an equal amount of the active substance, the crystallization onset temperature of the polypropylene compound comprising the inventive surface treated filler material product is significantly higher than for the prior art polypropylene compound. Furthermore, it can be seen from Table 4 that the surface treated filler material product according to the present invention has an effect at very low concentrations, the crystallization onset temperature of a polypropylene compound is 10° C. higher than for the virgin polymer (CE1 and E2).

The polypropylene master batches comprising 60 wt.-% CaCO$_3$ as summarized in Table 5 have been prepared by using the procedure as given under point 3.2 above. Polypropylene 3 according to Table 1 has been used. The surface treatment for CE14, E7, E8 and E9 has been performed as described under point 3.1. For E10 and E11 blends of E7 and CE14 were used for the master batch in a ratio of 50:50 and 10:90 respectively.

The results in Table 5 show that the polypropylene compounds comprising a filler surface treated with mixtures of a prior art surface treatment agent and the inventive surface treatment agent (E7 to E11) have higher crystallization onset temperatures than polypropylene compounds comprising an untreated filler (CE13) or fillers surface treated with a prior art surface treatment agent (CE14). A blend (E10 or E11) of a filler which has been surface treated with NOR (E7) and a filler which has been surface treated with stearic acid (CE14) gives similar results than a filler obtained by surface treatment of the filler with stearic acid and NOR (=E8 and E9).

TABLE 5

Crystallization onset temperature of polypropylene master batches.

| No. | Additive/Filler Kind | Amount [wt.-%]$^a$ | Surface treatment agent Kind | Amount [wt.-%]$^b$ | COT [° C.] |
|---|---|---|---|---|---|
| CE13 | CaCO$_3$ 1 | 60 | — | — | 122 |
| CE14 | CaCO$_3$ 1 | 60 | Stearic acid | 0.89 | 123 |
| E7 | CaCO$_3$ 1 | 60 | NOR | 0.61 | 140 |
| E8 | CaCO$_3$ 1 | 60 | NOR Stearic acid | 0.31  0.45 | 140 |
| E9 | CaCO$_3$ 1 | 60 | NOR Stearic acid | 0.06  0.80 | 138 |
| E10 | CaCO$_3$ 1 | 60 | NOR Stearic acid | 0.31$^c$  0.45$^c$ | 141 |
| E11 | CaCO$_3$ 1 | 60 | NOR Stearic acid | 0.06$^c$  0.80$^c$ | 138 |

$^a$Amount of additive/filler based on the weight of the polypropylene composition;
$^b$Amount of surface treatment agent based on the weight of the filler.
$^c$Effective coating amount of the blends from E7 and CE 14 based on the weight of the filler.

4.2 Crystallinity Cooling

The polypropylene compounds as summarized in Table 6 have been prepared by using the procedure as given under point 3.4, polypropylene 2 according to Table 1 has been used.

TABLE 6

Crystallinity cooling of polypropylene compounds.

| No. | Additive/Filler Kind | Amount [wt.-%]$^a$ | Surface treatment agent Kind | Amount [wt.-%]$^b$ | COT [° C.] | Crystallinity cooling [%] |
|---|---|---|---|---|---|---|
| CE15 | — | — | — | — | 121 | 46 |
| CE16 | CaCO$_3$ 1 | 1 | — | — | 121 | 48 |
| CE17 | CaCO$_3$ 1 | 10 | — | — | 122 | 46 |
| CE18 | CaCO$_3$ 1 | 20 | — | — | 124 | 49 |
| CE19 | CaCO$_3$ 1 | 40 | — | — | 126 | 48 |
| CE20 | CaCO$_3$ 1 | 1 | Stearic acid | 1 | 121 | 46 |
| CE21 | CaCO$_3$ 1 | 10 | Stearic acid | 1 | 121 | 49 |
| CE22 | CaCO$_3$ 1 | 20 | Stearic acid | 1 | 121 | 50 |
| CE23 | CaCO$_3$ 1 | 40 | Stearic acid | 1 | 121 | 49 |
| CE24 | Talc | 1 | — | — | 126 | 48 |
| CE25 | Talc | 10 | — | — | 130 | 46 |
| CE26 | Talc | 20 | — | — | 131 | 46 |
| CE27 | Talc | 40 | — | — | 133 | 49 |
| E12 | CaCO$_3$ 1 | 1 | NOR | 1 | 134 | 60 |
| E13 | CaCO$_3$ 1 | 10 | NOR | 1 | 137 | 59 |
| E14 | CaCO$_3$ 1 | 20 | NOR | 1 | 137 | 58 |
| E15 | CaCO$_3$ 1 | 40 | NOR | 1 | 139 | 51 |

$^a$Amount of additive/filler based on the weight of the polypropylene composition;
$^b$Amount of surface treatment agent based on the weight of the filler.

The results in Table 6 show that the polypropylene compounds comprising a filler surface treated with the inventive surface treatment agent (E12 to E15) have not only higher crystallization onset temperature but also higher crystallinity than polypropylene compounds comprising an untreated filler (CE16 to CE19) or fillers surface treated with a prior art surface treatment agent (CE20 to CE23) or talc which is known as an active nucleating mineral.

The polypropylene compounds as summarized in Table 7 have been prepared by using the procedure as given under point 3.4, polypropylene 2 according to Table 1 has been used.

As can be gathered from Table 7 the polypropylene compounds comprising a surface treated filler material product according to the present invention show at the same filler lever better mechanical properties than polypropylene compounds (E16 to E19) comprising untreated fillers (CE29 to CE32) or fillers treated with stearic acid (CE32 to CE36).

4.3 Mechanical Properties

TABLE 7

Mechanical properties of polypropylene compounds.

| No. | Additive/Filler Kind | Amount [wt.-%][a] | Surface treatment agent Kind | Amount [wt.-%][b] | Stress at yield [N/mm²] | E-Modulus [N/mm²] |
|---|---|---|---|---|---|---|
| CE28 | — | — | — | — | 32 | 1200 |
| CE29 | CaCO₃ 1 | 1 | — | — | 33 | 1349 |
| CE30 | CaCO₃ 1 | 10 | — | — | 31 | 1555 |
| CE31 | CaCO₃ 1 | 20 | — | — | 29 | 1713 |
| CE32 | CaCO₃ 1 | 40 | — | — | 24 | 2414 |
| CE33 | CaCO₃ 1 | 1 | Stearic acid | 1 | 33 | 1336 |
| CE34 | CaCO₃ 1 | 10 | Stearic acid | 1 | 32 | 1566 |
| CE35 | CaCO₃ 1 | 20 | Stearic acid | 1 | 29 | 1829 |
| CE36 | CaCO₃ 1 | 40 | Stearic acid | 1 | 25 | 2655 |
| E16 | CaCO₃ 1 | 1 | NOR | 1 | 36 | 1498 |
| E17 | CaCO₃ 1 | 10 | NOR | 1 | 34 | 1681 |
| E18 | CaCO₃ 1 | 20 | NOR | 1 | 32 | 1936 |
| E19 | CaCO₃ 1 | 40 | NOR | 1 | 28 | 2602 |

[a]Amount of additive/filler based on the weight of the polypropylene composition;
[b]Amount of surface treatment agent based on the weight of the filler.

4.4 Application in Thermoforming

The polypropylene compounds as summarized in Table 8 have been prepared by using the procedure as given under point 3.4, polypropylene 3 according to Table 1 has been used. The thermoforming has been carried out by using the procedure according to point 3.5.

TABLE 8

Mechanical properties before and after thermoforming.

| No. | Additive/Filler Kind | Amount [wt.-%][a] | Surface treatment agent Kind | Amount [wt.-%][b] | Yield strength (sheet) [N/mm²] | E-Modulus (sheet) [N/mm²] | Top load thermoformed box [N] |
|---|---|---|---|---|---|---|---|
| CE37 | — | — | — | — | 31.6 | 1470 | 260 |
| CE38 | CaCO₃ 1 | 20 | Stearic acid | 0.89 | 29.4 | 2120 | 304 |
| E20 | CaCO₃ 1 | 20 | NOR | 0.61 | 31.7 | 2230 | 401 |

[a]Amount of additive/filler based on the weight of the polypropylene composition;
[b]Amount of surface treatment agent based on the weight of the filler.

As can be gathered from Table 8 the mechanical properties of a sheet used for thermoforming and of the thermoformed box after the thermoforming process is improved when the surface treated filler material product according to the present invention is used.

4.5 Stability Tests

Preparation of the Melt Mixed Samples:

The formulations as given in Table 9 were dry blended in a Thermomix as described under 3.6 above. These blends were then melt compounded in the Thermo Haake Rheomix OS. The samples were then melt compressed and discs were punched out as described under 3.6 above.

TABLE 9

Formulation of melt mixed samples.

| Formulation | Polypropylene 1 | Calcium Carbonate 2 | Additive |
|---|---|---|---|
| C1 | 36 g | 40 g | 4 g Na-Salt of NOR |
| C2 | 36 g | 40 g | 2 g Ca-Salt of NOR |

XRD experiments were performed on the samples using rotatable PMMA holder rings.

TABLE 10

Dry blended samples for XRD.

| Formulation | Calcium Carbonate 2 | Additive |
|---|---|---|
| D1 | 400 mg | 50 mg Na-Salt of NOR |
| D2 | 400 mg | 50 mg Ca-Salt of NOR |

Samples were analyzed using rotatable carved silicon disc sample holders

XRD Measurements:

Phase Characterizations

The pure Ca-Salt of NOR and the pure Na-Salt of NOR were analyzed using rotatable carved silicon disc sample holders. Qualitative analyses of the XRD patterns of both samples are shown in FIG. 1. It can be seen that the main reflections of the salts of 2,3 Norbornanedicarboxylic acid are at low angles between 6.5° and 7° 2Θ. Comparison of the measured data of samples C1 and C2 with ICDD reference patterns (seen FIG. 2) revealed that no other phase present in the samples has any reflections in this diffraction range. Therefor the main reflections can be used for the identification of the salts.

FIG. 1 shows the qualitative phase analyses of the XRD patterns of pure Ca-Salt of NOR and the pure Na-Salt of NOR. The whole pattern is shown on the left, and a zoom of the main reflections is shown on the right. The pattern have been scaled in height, for better comparison.

Correction of 2Θ-Shift

Since the main reflections of the salts of 2,3 Norbornanedicarboxylic acid can be seen in a very narrow 2Θ-range a correction of instrumental shift and inaccuracy due to sample preparation and transparency has to be considered. The (0 1 2)-reflection of Calcite at 23.109° 2Θ has been used as a reference and the measurements of C1, C2, D1 and D2 have been shifted along 2Θ to match the position of the (0 1 2)-reflection of Calcite. The maximum shift observed has been 0.074° 2Θ.

Figure 2:
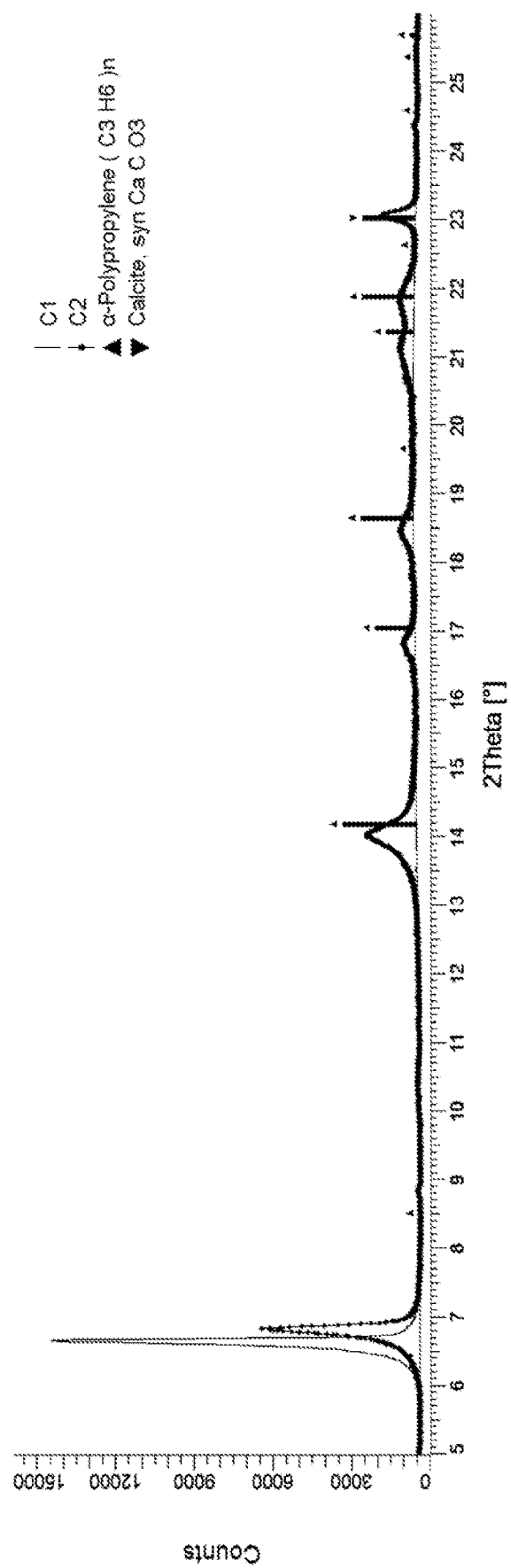

FIG. 2 shows the qualitative phase analyses of the XRD patterns of C1 and C2. Pattern of Calcite and polypropylene from the ICDD database is shown for comparison.

Identification of the Salts in Melt Mixed Samples

The identification of the salts of NOR in processed polypropylene has been done by comparison of the diffraction patterns of sample C1 and C2 with the diffraction patterns of samples D1 and D2 in the range of 5° to 8° 2Θ. The 2Θ-angle of the main reflections of the Na salts of NOR in the unprocessed and processed samples is identical. The same is true for the Ca-salts. Therefore, it can be concluded that no major change in chemistry and crystallography is observed due to the processing of the salts during melt mixing.

Figure 3:
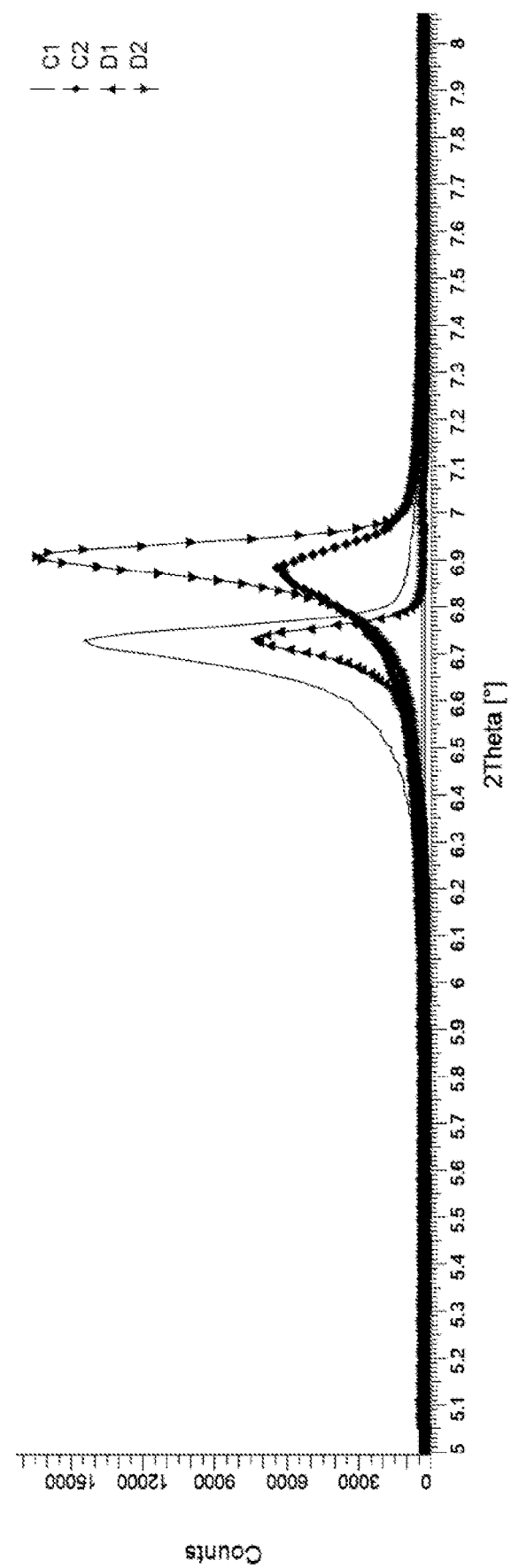

FIG. 3 shows the qualitative phase analyses of the XRD patterns of C1, C2, D1 and D2. The pattern has been zoomed for better visibility.

The invention claimed is:

1. A surface treated filler material product for alpha-nucleation of polyolefins, comprising
    (a) a calcium carbonate-comprising filler material, and
    (b) a bicyclo[2.2.1]heptane-2,3-dicarboxylic acid and/or a monovalent salt of the bicyclo[2.2.1]heptane-2,3-dicarboxylic acid and/or a divalent salt of the bicyclo[2.2.1]heptane-2,3-dicarboxylic acid being present on at least a part of the accessible surface area of the calcium carbonate-comprising filler material,
    wherein the amount of the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid, in mg, on the accessible surface area of the calcium carbonate-comprising filler material, in m$^2$, is from 0.001 mg/m$^2$ to 500 mg/m$^2$.

2. The surface treated filler material product according to claim 1, wherein the polyolefin is selected from the group consisting of polybutylene, polypropylene, polyethylene and mixtures thereof.

3. The surface treated filler material product according to claim 1, wherein the calcium carbonate-comprising filler material is selected from the group consisting of natural ground calcium carbonate, precipitated calcium carbonate, surface-modified calcium carbonate, and mixtures thereof.

4. The surface treated filler material product according claim 1, wherein the calcium carbonate-comprising filler material is selected from natural ground calcium carbonate, marble, limestone, chalk, dolomite, and mixtures thereof.

5. The surface treated filler material product according to claim 1, wherein the amount of the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid, in mg, on the accessible surface area of the calcium carbonate-comprising filler material, in m$^2$, is from 0.1 mg/m$^2$ to 30 mg/m$^2$.

6. The surface treated filler material product according to claim 1, wherein the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid is present on the accessible surface area of the calcium carbonate-comprising filler material in an amount of 0.0001 wt.-% to 30 wt.-%, based on the total dry weight of the calcium carbonate-comprising filler material.

7. The surface treated filler material product according to claim 1, wherein the monovalent salt of the bicyclo[2.2.1]heptane-2,3-dicarboxylic acid is selected from sodium salts, potassium salts, ammonium salts and mixtures thereof and/or the divalent salt of the bicyclo[2.2.1]heptane-2,3-dicarboxylic acid is selected from calcium salts, magnesium salts and mixtures thereof.

8. The surface treated filler material product according to claim 1, wherein the surface treated filler material product further comprises
    (c) at least one hydrophobising agent on at least a part of the accessible surface area of the calcium carbonate-comprising filler material, wherein the amount, in mg, of the at least one hydrophobising agent on at least a part of the accessible surface area of the calcium carbonate-comprising filler material, in m$^2$, is from 0.001 to 9 mg/m$^2$.

9. The surface treated filler material product according to claim 8, wherein the at least one hydrophobising agent is selected from the group consisting of an aliphatic carboxylic acid having a total amount of carbon atoms from $C_4$ to $C_{24}$ and/or reaction products thereof, a mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or reaction products thereof, a phosphoric acid ester blend of one or more phosphoric acid mono-ester and/or reaction products thereof and one or more phosphoric acid di-ester and/or reaction products thereof, a polyhydrogensiloxane and/or reaction products thereof, an inert silicone oil and/or reaction products thereof, polydimethylsiloxane and/or reaction products thereof, an aliphatic aldehyde and/or reaction products thereof, and mixtures thereof.

10. A process for the preparation of the surface treated filler material product according to claim 1, comprising the following steps:
    (i) providing a calcium carbonate-comprising filler material,
    (ii) providing a bicyclo[2.2.1]heptane-2,3-dicarboxylic acid and/or a monovalent salt of the bicyclo[2.2.1]heptane-2,3-dicarboxylic acid and/or a divalent salt of the bicyclo[2.2.1]heptane-2,3-dicarboxylic acid,
    (iii) contacting the calcium carbonate-comprising filler material and the bicyclo[2.2.1]heptane-2,3-dicarboxylic acid and/or the monovalent salt of the bicyclo[2.2.1]heptane-2,3-dicarboxylic acid and/or the divalent salt of the bicyclo[2.2.1]heptane-2,3-dicarboxylic acid at a temperature in the range from 157 to 300° C.

11. The process according to claim 10, wherein the process further comprises a step of
    (iv) drying the surface treated filler material product after step (iii), at a temperature in the range from 60 to 200° C., and/or
    (v) treating the calcium carbonate-comprising filler material before and/or during and/or after step (iii) or the surface treated filler material product obtained in step (iv) in one or more steps with at least one hydrophobising agent at a temperature from 30 to 200° C., wherein the at least one hydrophobising agent is added in an amount such that the amount, in mg, of the at least one hydrophobising agent on the accessible surface area of the calcium carbonate-comprising filler material, in m$^2$, is from 0.001 to 9 mg/m$^2$.

12. A master batch comprising the surface treated filler material product according claim 1 and a polyolefin.

13. A process for preparing a master batch comprising steps (i) to (iii) according to claim 11 and optionally steps (iv) and/or (v) according to claim 11 and a further step (I) of incorporating >55 to 90 wt.-% of the surface treated filler material product obtained after step (iii), (iv) or (v) into a polyolefin.

14. A polyolefin composition comprising the surface treated filler material product according to claim 1.

15. A process for preparing a polyolefin composition comprising steps (i) to (iii) according to claim 10 and optionally steps (iv) and/or (v) and a further step (I) of incorporating 0.01 wt.-% to 55 wt.-% of the surface treated filler material product obtained after step (iii), (iv) or (v) into a polyolefin.

16. The master batch and/or polyolefin composition according to claim 12, wherein the polyolefin is selected from the group consisting of polybutylene, polypropylene, polyethylene and mixtures thereof.

17. The polyolefin composition according to claim 14, comprising 0.01 wt.-% to 55 wt.-% of the surface treated filler material product, based on the total weight of the polyolefin composition.

18. An article comprising the polyolefin composition according to claim 16.

19. The surface treated filler material product according to claim 1 suitable for use as an alpha-nucleating agent for polyolefins.

20. The surface treated filler material product according to claim 1 suitable for use as an alpha-nucleating agent for polypropylene.

\* \* \* \* \*